Figure 11:
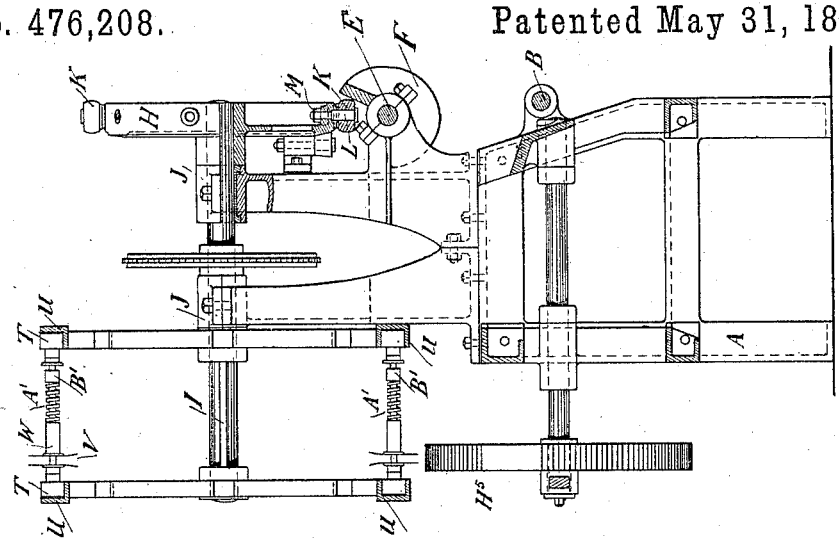

(No Model.) 11 Sheets—Sheet 1.
C. W. LOVELL & A. BREDENBERG.
BOOK BINDING AND COVERING MACHINE.
No. 476,208. Patented May 31, 1892.
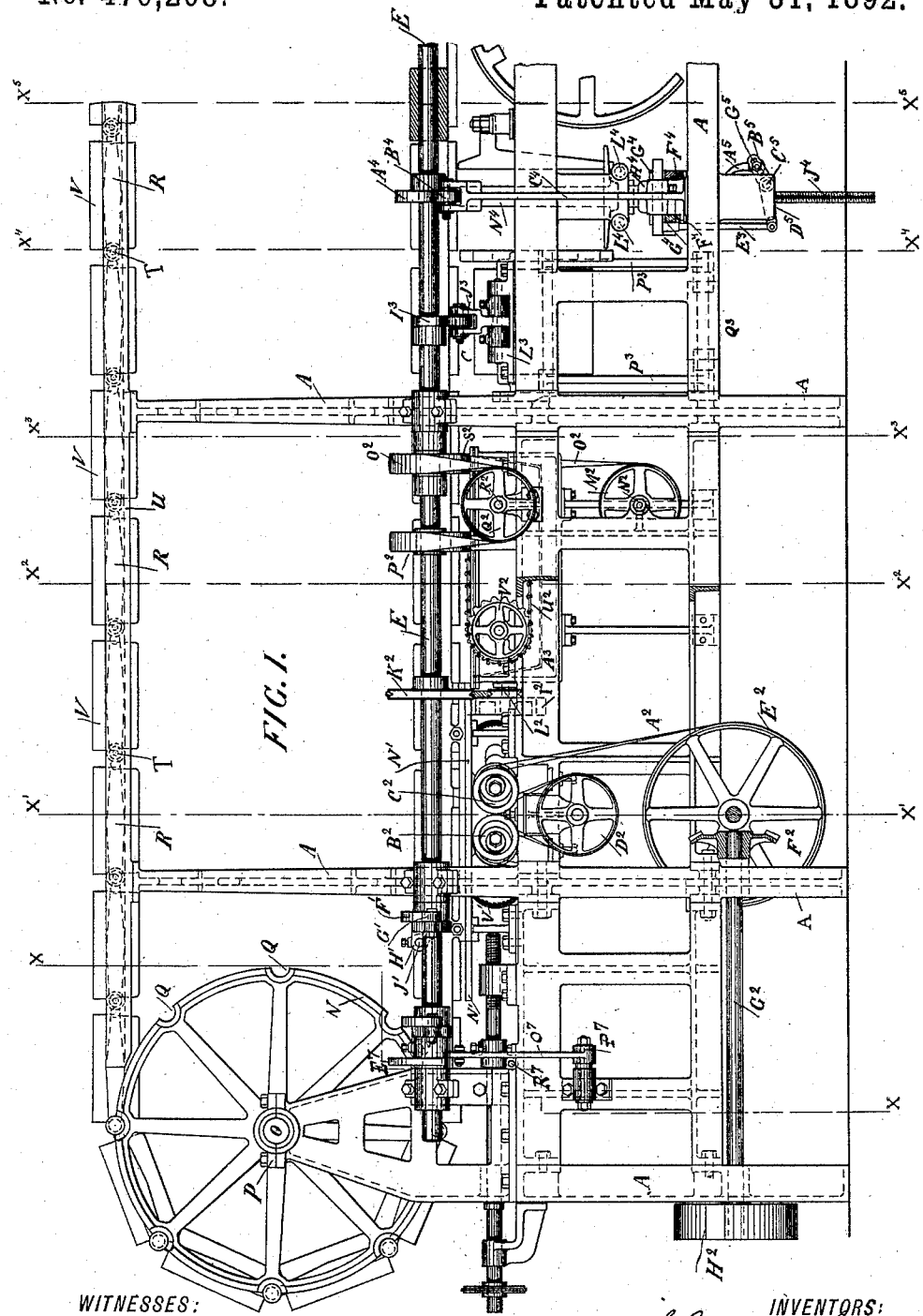
FIG. I.
WITNESSES:
Pontus Valentine,
Charles Ryder
INVENTORS:
Charles W. Lovell
and Alfred Bredenberg
BY Phillips Abbott.
their ATTORNEY.

(No Model.) 11 Sheets—Sheet 2.
C. W. LOVELL & A. BREDENBERG.
BOOK BINDING AND COVERING MACHINE.
No. 476,208. Patented May 31, 1892.
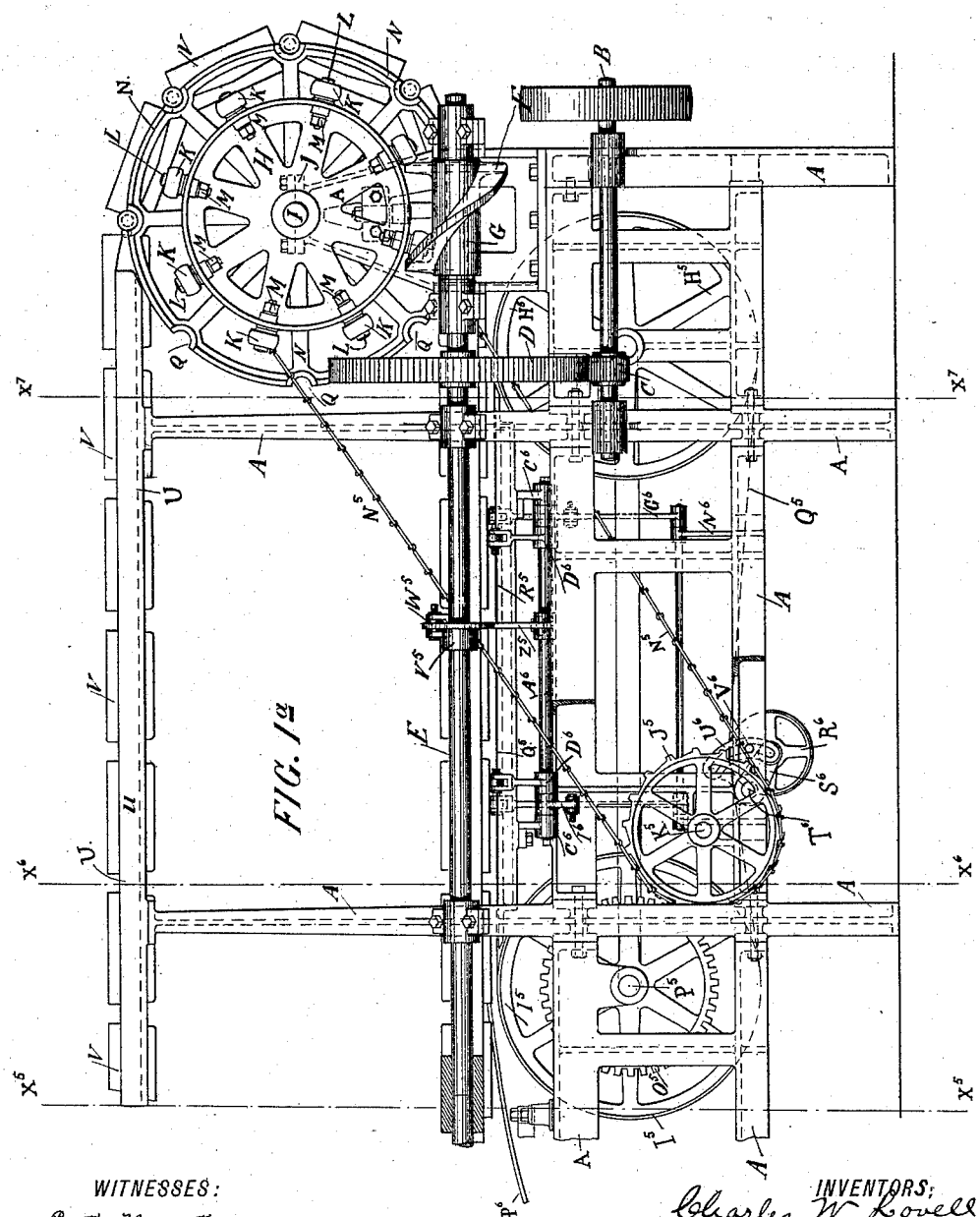
FIG. 1ª
WITNESSES:
Pontus Valentine
Charles Ryder
INVENTORS:
Charles W. Lovell
and Alfred Bredenberg
BY Phillips Abbott
their ATTORNEY.

(No Model.) 11 Sheets—Sheet 3.
C. W. LOVELL & A. BREDENBERG.
BOOK BINDING AND COVERING MACHINE.
No. 476,208. Patented May 31, 1892.
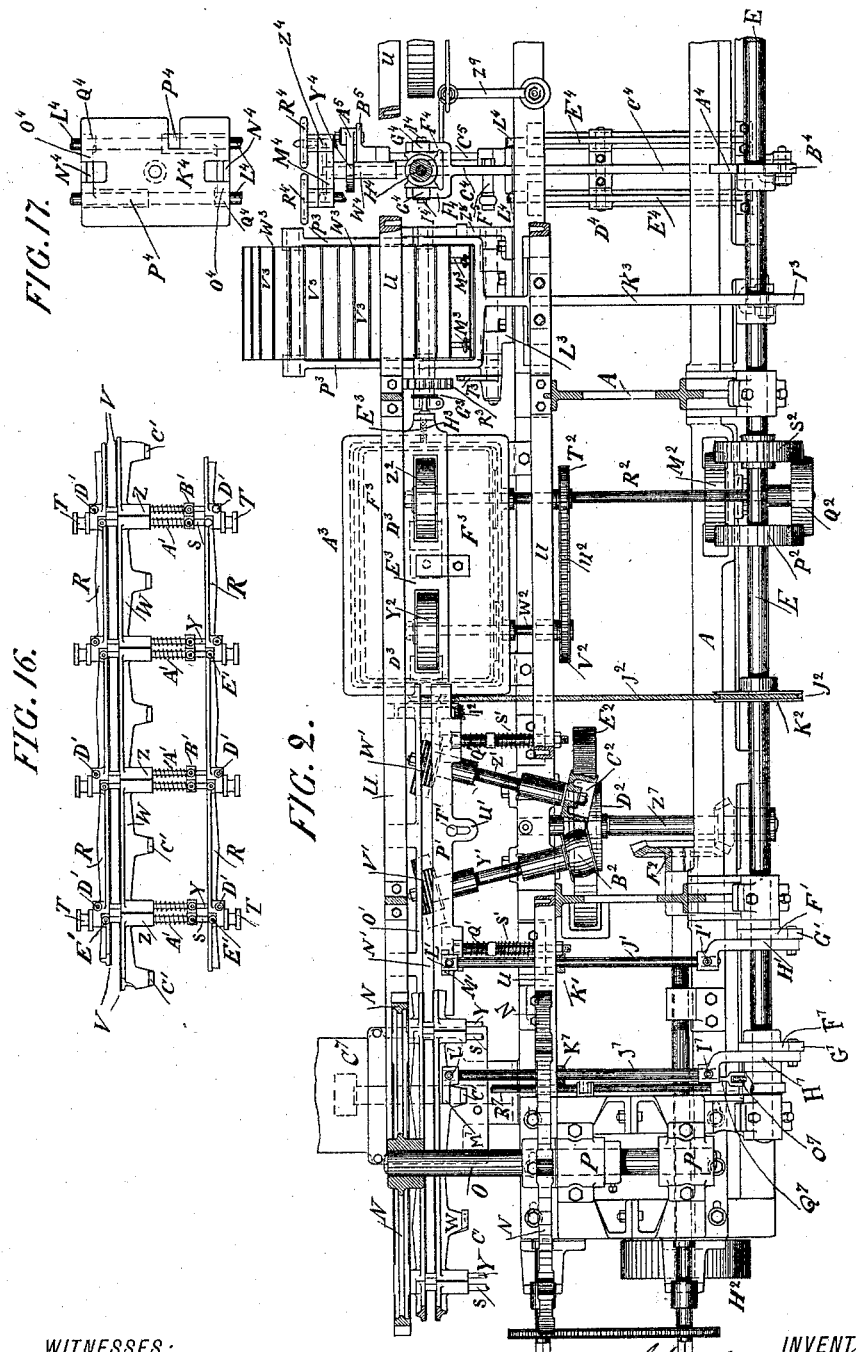
WITNESSES:
Pontus Valentine
Charles Ryder
INVENTORS:
Charles W. Lovell
and Alfred Bredenberg
BY Phillips Abbott
their ATTORNEY (No Model.) 11 Sheets—Sheet 4.
C. W. LOVELL & A. BREDENBERG.
BOOK BINDING AND COVERING MACHINE.
No. 476,208. Patented May 31, 1892.
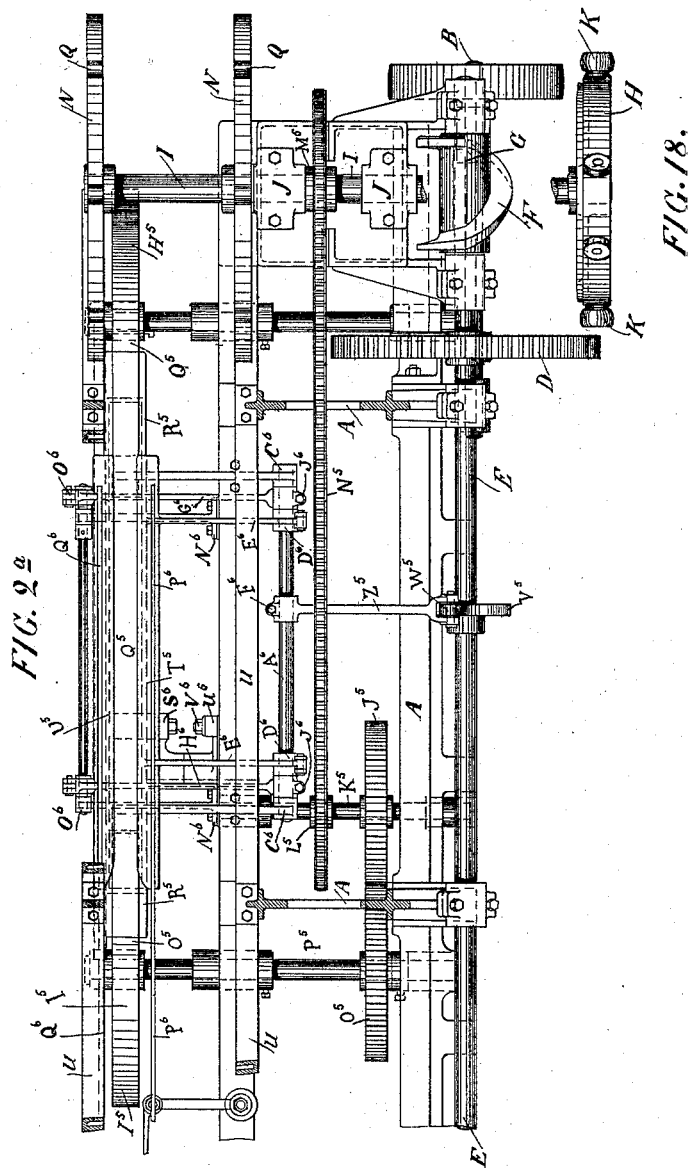
WITNESSES:
Pontus Valentine
Charles Ryder
INVENTORS:
Charles W. Lovell
and Alfred Bredenberg
BY Phillips Abbott
their ATTORNEY.

(No Model.) 11 Sheets—Sheet 5.
C. W. LOVELL & A. BREDENBERG.
BOOK BINDING AND COVERING MACHINE.
No. 476,208. Patented May 31, 1892.
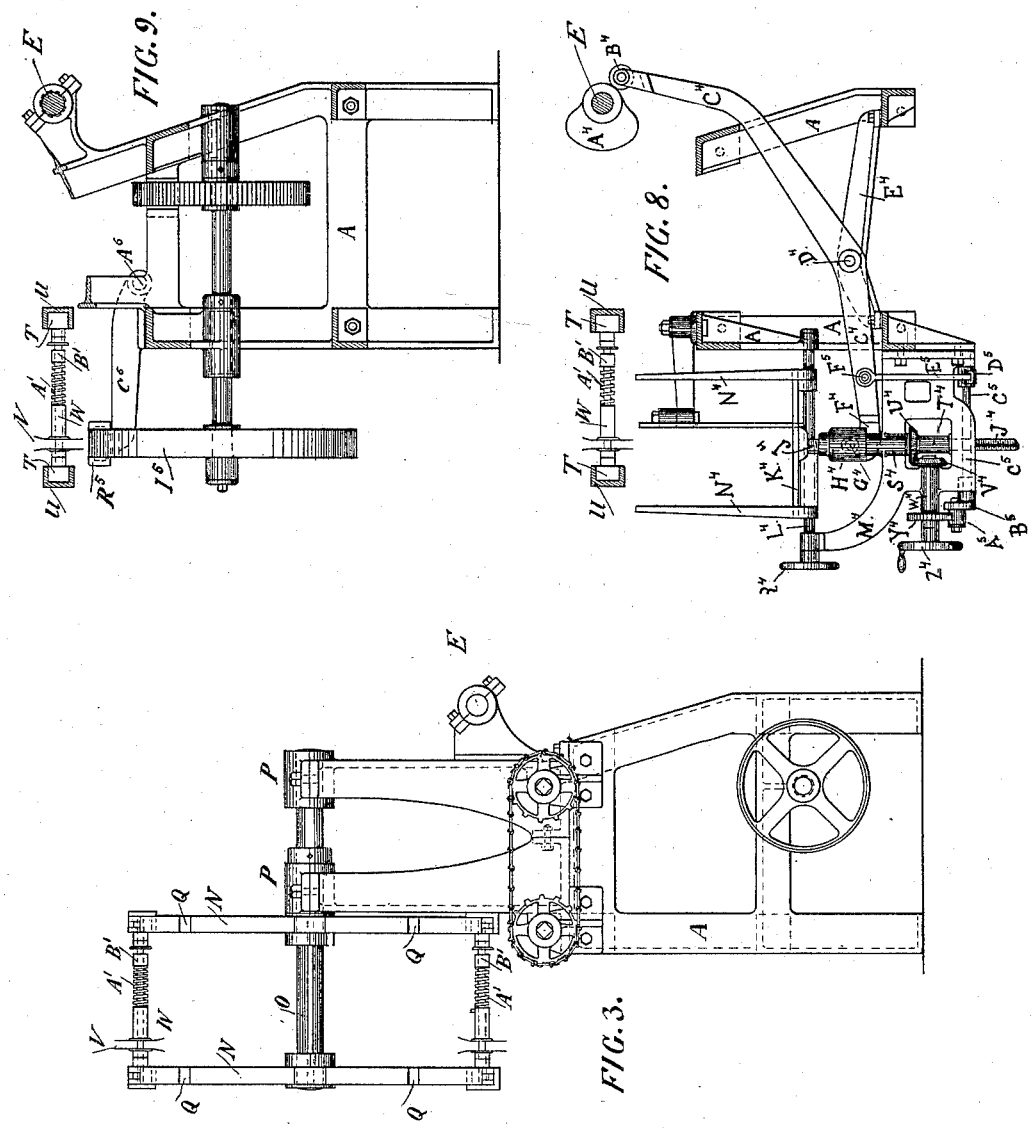
WITNESSES:
Pontus Valentine.
Charles Ryder
INVENTORS:
Charles W. Lovell &
Alfred Bredenberg
BY Phillips Abbott
their ATTORNEY.

(No Model.) 11 Sheets—Sheet 6.
C. W. LOVELL & A. BREDENBERG.
BOOK BINDING AND COVERING MACHINE.
No. 476,208. Patented May 31, 1892.
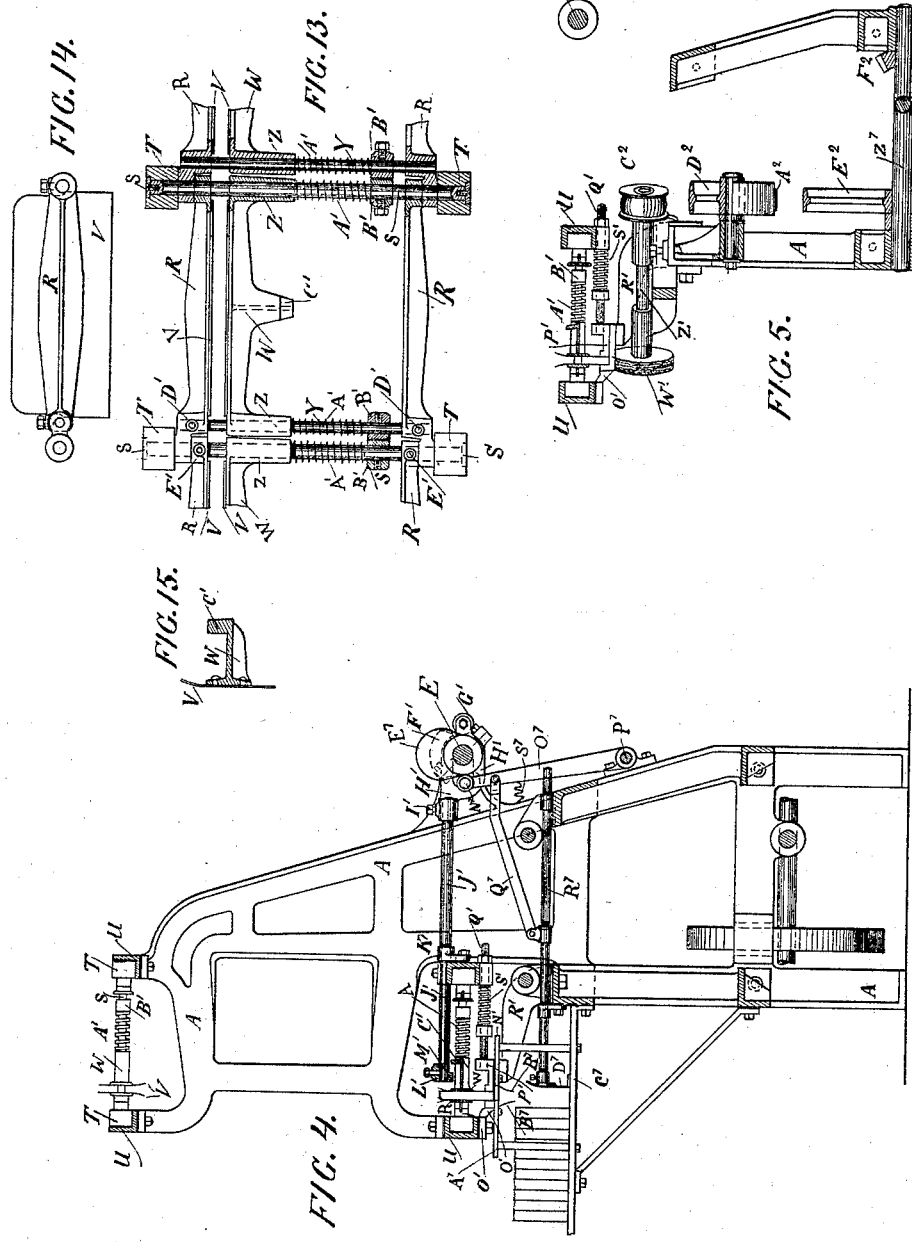
WITNESSES:
Pontus Valentine
Charles Ryder
INVENTORS:
Charles W. Lovell and
Alfred Bredenberg
BY
Phillips Abbott
their ATTORNEY.

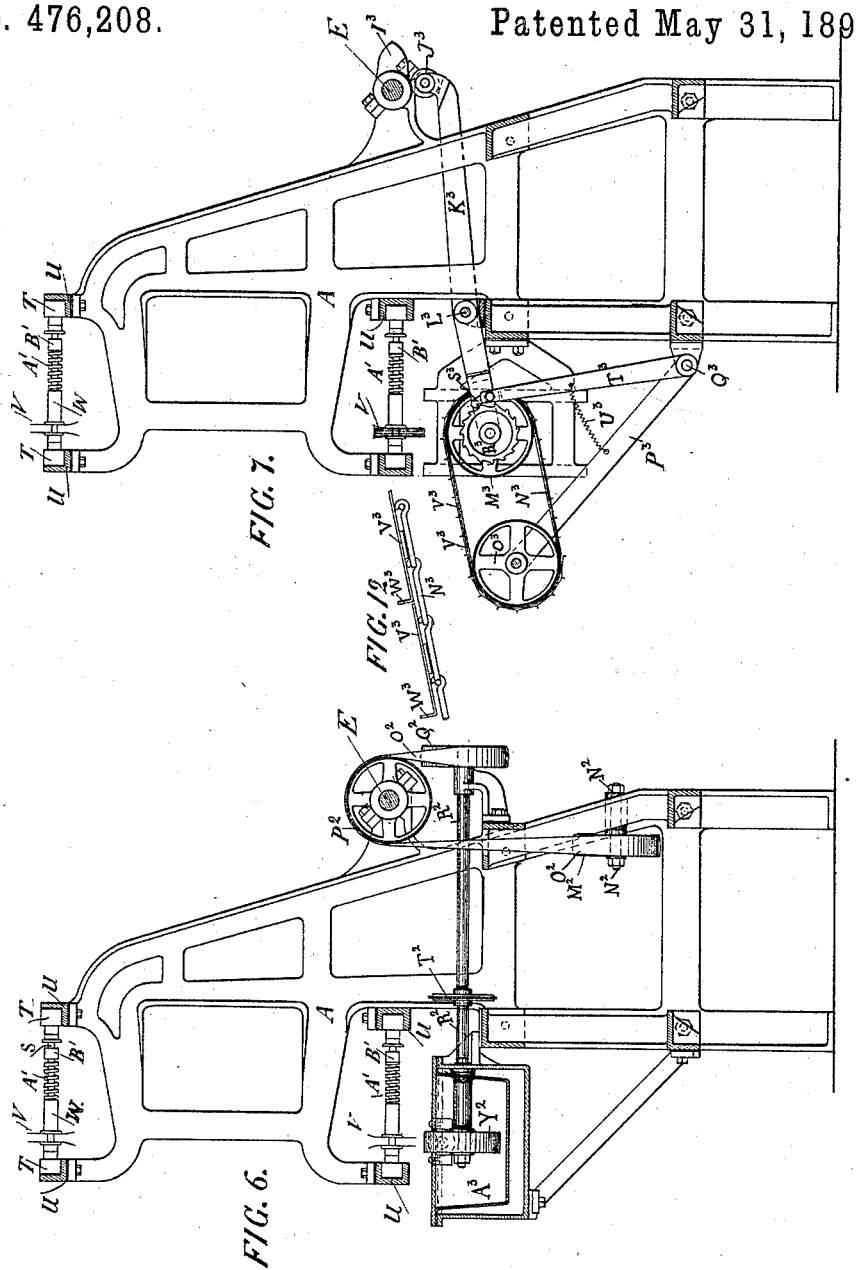

(No Model.) 11 Sheets—Sheet 8.

C. W. LOVELL & A. BREDENBERG.
BOOK BINDING AND COVERING MACHINE.

No. 476,208. Patented May 31, 1892.

WITNESSES:
Pontus Valentine.
Charles Ryder

INVENTORS:
Charles W. Lovell
and Alfred Bredenberg
BY Phillips Abbott
their ATTORNEY.

(No Model.) 11 Sheets—Sheet 9.
C. W. LOVELL & A. BREDENBERG.
BOOK BINDING AND COVERING MACHINE.
No. 476,208. Patented May 31, 1892.
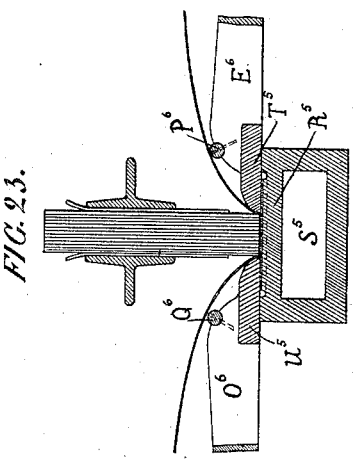
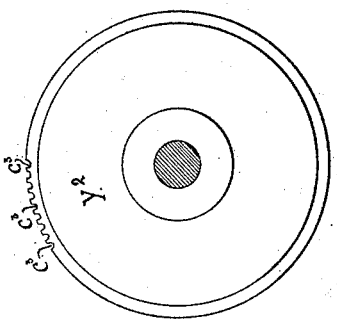
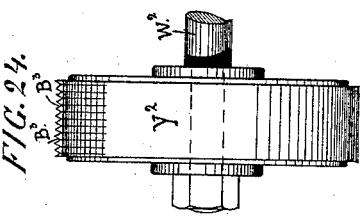
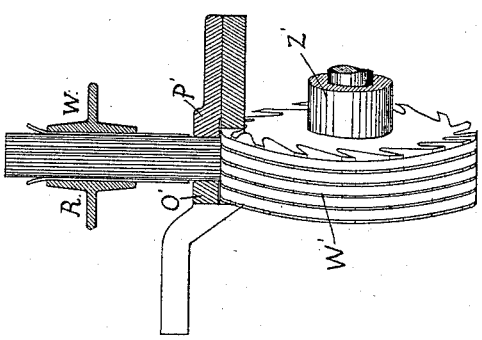
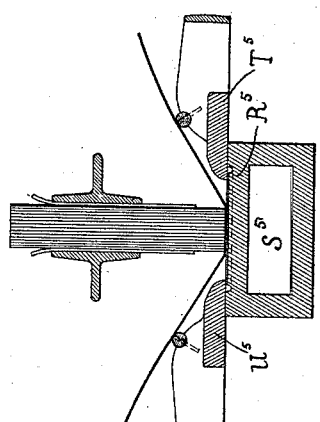
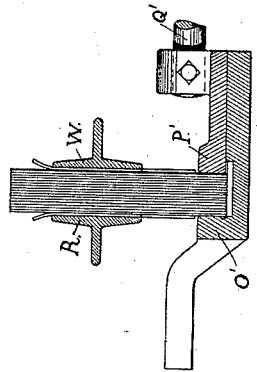
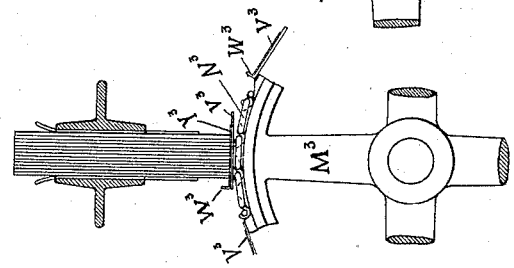
WITNESSES:
Pontus Valentine.
Charles Ryder
INVENTORS:
Charles W. Lovell
and Alfred Bredenberg
BY Phillips Abbott
their ATTORNEY.

(No Model.) 11 Sheets—Sheet 10.
C. W. LOVELL & A. BREDENBERG.
BOOK BINDING AND COVERING MACHINE.
No. 476,208. Patented May 31, 1892.
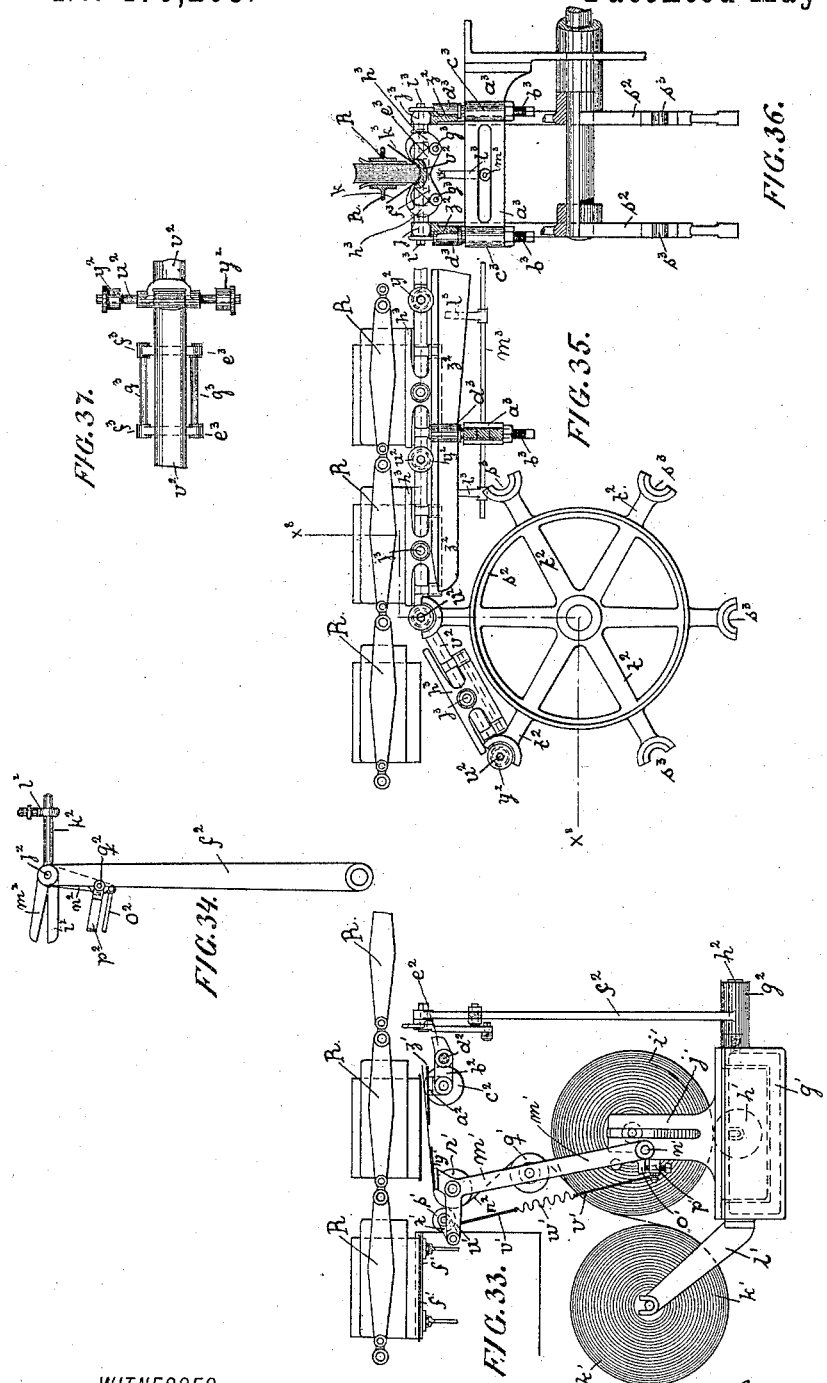
WITNESSES:
Pontus Valentine
Charles Ryder
INVENTORS:
Charles W. Lovell
and Alfred Bredenberg
BY Phillips Abbott
their ATTORNEY.

(No Model.) 11 Sheets—Sheet 11.
C. W. LOVELL & A. BREDENBERG.
BOOK BINDING AND COVERING MACHINE.
No. 476,208. Patented May 31, 1892.
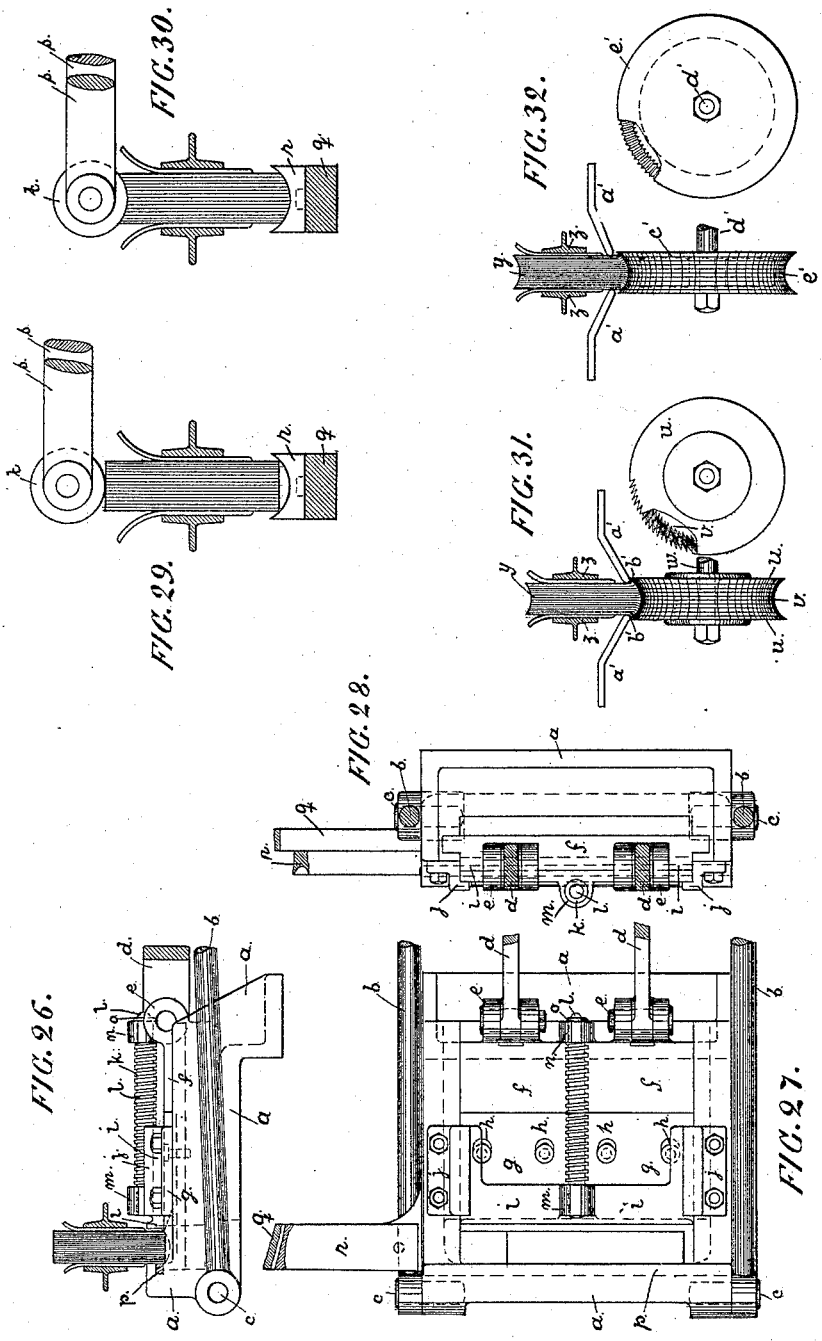

UNITED STATES PATENT OFFICE.

CHARLES W. LOVELL AND ALFRED BREDENBERG, OF BROOKLYN, ASSIGNORS OF ONE-THIRD TO JOHN W. LOVELL, OF NEW YORK, N. Y.

BOOK BINDING AND COVERING MACHINE.

SPECIFICATION forming part of Letters Patent No. 476,208, dated May 31, 1892.

Application filed September 17, 1891. Serial No. 406,030. (No model.)

*To all whom it may concern:*

Be it known that we, CHARLES W. LOVELL and ALFRED BREDENBERG, citizens of the United States, and residents of Brooklyn, in the county of Kings and State of New York, have invented certain new and useful Improvements in Book Binding and Covering Machines, of which the following is a specification.

Our invention relates to improvements in book binding and covering machines, and in certain respects it has a general resemblance to the book-covering machine for which we filed an application for Letters Patent November 21, 1890, the same being Serial No. 372,191.

The essential features of our invention, broadly stated, are as follows: The machine is so constructed that it is adapted to take the books in separate sheets or leaves or separated signatures properly arranged to constitute a completed book, which are automatically clamped by the machine, and are carried first over saws or knives, or both, whereby the back edges of the sheets or signatures are evened, roughened, or fibered and given a desired shape and condition for the reception of adhesive material. Then the books are successively carried over specially constructed and arranged gluing devices, whereby glue or other adhesive material is properly applied to the backs of the books, and then they are further carried through the machine and suitable backing material of such kind as may be preferred is automatically applied to their backs. Then as the machine further operates the paper cover is fed and attached to the book, and thereafter the covers are pressed upon, dried, and broken around the edges of the backs of the books, which are then carried by the machine while the adhesive material sets, and are finally delivered in a completed condition upon a table or its equivalent, suitably arranged for packing or further manipulation.

Our invention also relates to or comprises certain attachments to the machine, whereby we are enabled to make round-back books adapted to receive leather or cloth cases or covers, and the machine is so constructed that a plurality of books may be operated upon at the same time, and so that there is no back motion or movement of the machine, it moving always forwardly and accomplishing work at each step, so that there is no loss in time.

Our invention also comprises the details of construction of the machine and the process worked out by it, as hereinafter set forth.

In the drawings the same reference-letters indicate the same parts in all the figures.

Figure 10:
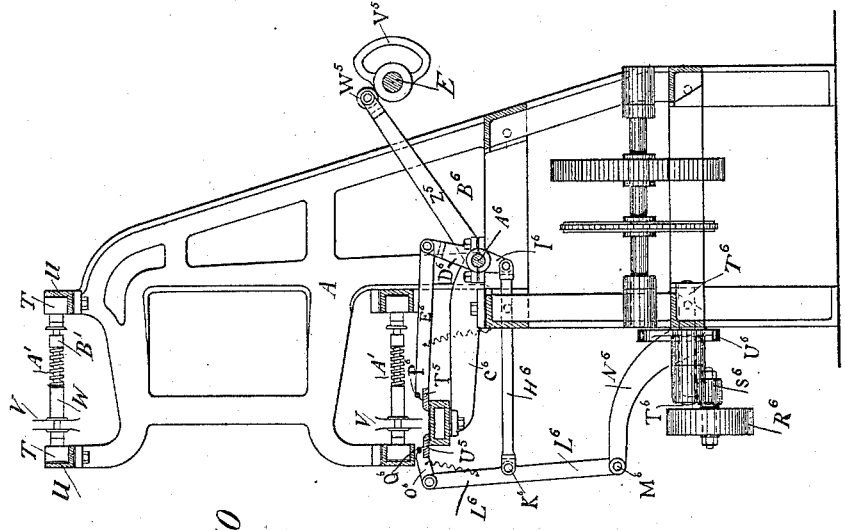

Figure 1 is an elevation of the left-hand end of the machine. Fig. 1$^a$ is a view, the same as Fig. 1, showing the right-hand end of the machine. These two figures taken together show a side elevation of the complete machine. Fig. 2 is a plan view of the left-hand end of the machine. Fig. 2$^a$ is a plan view of the right-hand end of the machine. These two figures taken together constitute a plan view of the complete machine. Fig. 3 is an end view of the left-hand end of the machine. Fig. 4 is a sectional view seen from the left-hand end of the machine, taken on the line $x\,x$ of Fig. 1. Fig. 5 is a sectional view, seen from the left, taken on the line $x'\,x'$ of Fig. 1. Fig. 6 is a sectional view, seen from the left, taken on the line $x^2\,x^2$ of Fig. 1. Fig. 7 is a sectional view, seen from the left, taken on the line $x^3\,x^3$ of Fig. 1. Fig. 8 is a sectional view, seen from the left, taken on the line $x^4\,x^4$ of Fig. 1. Fig. 9 is a sectional view, seen from the left, taken on the line $x^5\,x^5$ of Fig. 1 and also on the same line in Fig. 1$^a$. Fig. 10 is a sectional view, seen from the left, taken on the line $x^6\,x^6$ of Fig. 1$^a$. Fig. 11 is a sectional view, seen from the left, taken on the line $x^7\,x^7$ of Fig. 1$^a$. Fig. 12 is an enlarged view of the chain or carrier which feeds the backing material, as shown in Fig. 7. Fig. 13 is a detail, shown in plan and partly sectioned, of the book-carrying chain. Fig. 14 is an elevation of one of the links of the book-carrying chain, showing one-half of the clamp attached thereto. Fig. 15 is a detail of the clamp opening or retracting devices, shown in section. Fig. 16 is a plan of a number of the links of the book-carrying chain, showing the clamps and some of the coacting parts. Fig. 17 is a detached plan view of the cover-feeding table. Fig. 18 is a detached plan view of the driving-wheel for the book-carrying chain. Fig. 19 is an edge view of the leaves or signatures clamped ready for the action of the back-trimming devices. Fig. 20 is a like view showing the trimming devices in operation. Fig. 21 is a like view showing the devices for applying the backing material. Fig. 22 is a like view showing the cover drying and breaking devices. Fig. 23 is a view of the parts as shown in Fig. 22 in their second position. Figs. 24 and 25 are details of the glue-rollers. Fig. 26 is a detached endwise elevation of the book clamping and shearing devices for making round-back books. Fig. 27 is a plan of the parts shown in Fig. 26. Fig. 28 is a detached sidewise elevation of the parts shown in Figs. 26 and 27. Fig. 29 is a detached end elevation of the back-rounding devices about to operate. Fig. 30 is a view, the same as Fig. 29, showing the position of the parts for rounding the back at the end of the operation. Fig. 31 is an endwise elevation of the back dressing or surfacing devices for round-back books, the saws being also represented in side view. Fig. 32 is a view similar to Fig. 31, showing the gluing devices for round-back books. Fig. 33 is a side elevation showing the devices for applying the backing material to round-back books. Fig. 34 is a detail of the devices for severing the backing material. Fig. 35 is an elevation of the devices for pressing, drying, and breaking the backing material upon round-back books. Fig. 36 is an endwise elevation of the devices shown in Fig. 35 on the line $x^8 x^8$ of that figure. Fig. 37 is a detail of the clamps for attaching the backing material on round-back books.

Referring first to Figs. 1, $1^a$, 2, and $2^a$, A is the frame of the machine. It may be made of any preferred material, but preferably iron. B is the main driving-shaft, to which power is applied in any preferred manner. C is a pinion keyed upon the driving-shaft, which meshes into a gear D upon the main shaft E of the machine, and upon this shaft E is a helical cam F, cast or otherwise supported upon a hub G, which is bored so as to fit the shaft E, to which it is keyed. The cam F in its rotation engages with the chain-driving wheel H, which is set upon the end of the shaft I, which is journaled in bearings J J, supported on the frame of the machine. This driving-wheel H has upon its periphery a number of rollers K K, &c., which rotate upon studs L, fastened by nuts M to the periphery of the wheel H, and these rollers are so spaced upon the periphery of the wheel H and there are such a number of them that they will co-act with the helical cam F in such manner as to rotate the driving-wheel H intermittently, or, in other words, by a step-by-step movement. N N N N are four large carrier-wheels. The two at the right-hand end of the machine are keyed to the shaft I, and the two at the left-hand end of the machine are keyed to a shaft O, which revolves in bearings P, supported upon the frame of the machine. Q Q, &c., are notches made in the peripheries of the wheels N N, &c., preferably opposite the spokes thereof, in which the cross-bolts S S, &c., of the book-carrier chain engage. R R, &c., are the links of the book-carrying chain. The construction of these links and their arrangements in the book-carrying chain is well seen in Fig. 13—that is to say, the ends of each pair of links are pivoted upon a cross-bolt S, the bolt extends beyond the links, and upon the ends of each bolt there are placed small rollers T T, adapted to roll along a track or way U U, supported upon uprights forming part of the frame A. In this way sagging of the parts is prevented. V V are clamp-plates attached to the inner face of the line of links R, which is upon the outside of the machine. There are no clamp-plates upon the line of links that is upon the inside of the machine. W W (see Fig. 13) are the counterpart clamp-plates for those which are set upon the links of the chain, as before stated. They are mounted upon the cross-bolts S at one end and at the other upon a cross bolt or rod Y, there being sleeves Z Z at the ends of the clamps W, whereby they are adapted to slide smoothly and easily upon the cross bolts or rods S and Y. A' A' are springs, which encircle the rods S and Y, respectively, and normally exert a closing pressure upon the movable clamps W. Their tension may be regulated by set-nuts B'. The clamps W are provided with an upwardly-extending lug C', whereby they are withdrawn and the clamps opened, as hereinafter set forth. The rod or cross-bolt Y is entered into the links R R at its ends and held fast by set-screws E', and the other ends of these links are fastened to the cross-bolts S by similar set-screws E'.

In order that the construction of the machine may be more easily perceived, the devices will be described in the order of operation of the machine. Consequently the devices employed for opening the clamps that the sheets or signatures composing the book may be placed within them will first be described, and after that the back-dressing devices, then the gluing devices, and so on in succession. To begin with, therefore, First. The clamp-opening devices, (see especially Figs. 1, 2, and 4:) F' F' is a cam mounted upon the shaft E, which engages with a roller G', mounted on a recessed frame H', which is guided by and slides upon the shaft E and which is fastened by a set-screw I' to the end of a longitudinally-sliding bar J', which slides through a bearing K', made on or attached to the slideway U, and at the forward end of the slide-bar J' is a dog L', fastened by a set-screw, as shown, which has a rectangular projecting part M', which engages with the lug C' of the movable jaws W as they successively coincide with it during the operation of the machine, and the parts are so timed that at each intermittent movement one of the jaws W will coincide in position with the parts just described and will rest there, while the cam F′, by reason of the continued revolution of the shaft E, retracts the slide-bar J′, and consequently the movable jaw W, because of the engagement of the part M′ of the dog L′ with the lug C′ on the clamp compressing the springs A′, and during the time that the clamp is thus opened the operator places the leaves or signatures of a book, which of course have been properly arranged, between the clamps R and W, allowing them to drop until they rest upon a table N′, (see Fig. 1,) whereby the book is properly supported in a vertical line, so that it will register with the other devices in its passage through the machine. As the shaft still further revolves the cam F′ passes the roller G′, and the clamps W, acted upon by the springs A′, close upon and grip the book and carry it forward to the back-dressing devices.

Second. The back-dressing devices: As the book is carried forward the lower portion or back thereof, which projects downwardly from the clamps, slides between a fixed guide O′ on the machine and another counterpart guide P′, supported on the ends of rods Q′ and supported vertically upon the table N′, all the parts being supported on a bracket R′, (see Fig. 4,) and this movable guide P′ is pressed toward the fixed guide O′ by springs S′, which encircle the rods Q′, and the tension of these springs is such that the book will readily and without injury slide between them as it is carried through the machine, irrespective of the thickness of the book. The faces of the guides are of course smoothed and preferably polished. The guide P′ is prevented from longitudinal movement by a headed pin T′, which plays through a slot made in a lug U′, formed on the rear of the guide P′. The pin T′ is fastened into the table N′ or any other suitable support. As the book is carried along through these guides it comes in contact with two gangs of saws V′ and W′. These are set at different angles (see Fig. 2) upon shaft Y′ and Z′, they being driven by a belt A², which passes over pulleys B² and C², set upon the shaft Y′ and Z′, respectively, and also around the idler D². The belt A² passes around a driving-pulley E², which is mounted on a shaft Z⁷, which may be driven in any suitable manner. We show it as driven by a beveled gear F², mounted upon a shaft G², which is driven by a belt-pulley H². We obtain such adjustments as are desirable to maintain these parts in proper running order by means of set-screws, (shown in Fig. 1,) which take a bearing upon the boxes in which the shafts of the pulleys B², C², and D², respectively, revolve, which bodily elevate or depress those boxes, thus giving any desired adjustment. In Figs. 19 and 20 the position of the parts during the surfacing of the back of the book is clearly shown. In Fig. 19 the book is shown as being carried along through the two guides O′ and P′, and in Fig. 20 the saws W′ are shown sawing off the back of the book, or, in other words, surfacing it for the reception of the backing material. We place the saws at different angles and employ two sets of them, so that we may avoid concaving the back of the book, as would be the case if the saw run crosswise, also tearing the leaves, as would be the case in running the saws lengthwise of the book. We wish it to be understood, however, that good results can be obtained by running the saws either lengthwise or crosswise under many circumstances. We therefore do not limit ourselves to saws arranged as we show them. This is simply the preferred arrangement. Nor do we limit ourselves to two sets of saws. A single saw may under many circumstances be employed. By these devices the back of the book is made uniform, even, and fibrous, and the folds of the signatures are removed, exposing the edge of each individual sheet, and the back of the book is adapted to receive the adhesive material; but in order that all dust, loose pieces of fiber, &c., may be removed prior to the application of the adhesive material we employ a transversely-arranged rotary brush I², which is mounted upon a little shaft suitably journaled upon the frame of the machine, which is driven by a belt J², which passes over a grooved pulley K², set upon the shaft E, and around the little pulley L², fastened upon the brush-shaft. The upper arc of this brush sweeps across the back of the book and removes all loose particles and additionally pulls out the fibers of the paper. The machine next carries the book and subjects its back to the operation of—

Third. The gluing devices, which are as follows: M² is a pulley upon a shaft N², suitably journaled on the frame of the machine. From it runs a belt O², which passes over a pulley P², which is keyed to the shaft E, thence around a pulley Q², fastened upon the end of a shaft R², thence over an idler-pulley S², and under the pulley M² again. In this way the shaft R² is driven by the power derived from the shaft E. On the shaft R² is a sprocket-wheel T², over which a sprocket-chain U² passes, which engages with another sprocket-wheel V², supported on a shaft W², upon which is one of the glue-rollers Y², the other glue-roller Z² being upon the shaft R². These two glue-rollers revolve in the glue-tank A³, their lower portion running in the glue or other adhesive matter in a manner well understood. In Figs. 24 and 25 we show our preferred construction of these glue-rollers, and they are preferably made of metal, and their peripheries are scored circumferentially with little grooves B³, which are shown in Fig. 25. They are likewise scored transversely with other grooves C³. In this way the somewhat sharp or pointed projections from the face of the glue-rollers penetrate the fibrous and partially-yielding backs of the books and in a very effective manner work the cementing or adhesive material into and upon them, thus securing good adhesion of the backing materials. We prefer to use two glue-rollers so as to be sure to secure a thorough application of adhesive material. We do not, however, limit ourselves to a plurality of glue-rollers. Under many circumstances one will answer very well. Nor do we confine ourselves to rollers having roughened surfaces. In order that excess of glue may be removed from the rollers within the tank, we provide scrapers $D^3$ $D^3$, which are attached to a sliding frame or strip of metal $E^3$, which slides in rabbets made in the edges of the cover $F^3$ of the glue-tank, and we secure accurate adjustment by means of a little thumb-screw $G^3$, which is attached by a spindle $H^3$ to the end of the frame $E^3$. This spindle is threaded at its end and screws in and out of a threaded hole made in the side of the glue-tank. By this means we can with great nicety adjust the little scrapers $D^3$ toward or from the glue-rollers, thus removing excess of glue and lumps, bubbles, &c. After the book has passed these gluing devices it comes next to—

Fourth. The devices for feeding and applying the backing material. They are as follows: Upon the shaft E (see Figs. 1, 2, and 7) is keyed a cam $I^3$, which engages with a roller $J^3$ upon the end of a rocking lever $K^3$, which is pivoted to the frame at $L^3$, and upon the free end of this lever is mounted a pair of sprocket-wheels $M^3$, over which pass sprocket-chains $N^3$, which engage other sprocket-wheels $O^3$, which are mounted in a swinging frame $P^3$, which is pivoted to the main frame of the machine at $Q^3$, and upon the axle of the first-named sprocket-wheel $M^3$ is keyed a ratchet-wheel $R^3$, with which engages a pawl $S^3$, attached to the end of a pivoted arm $T^3$, and $U^3$ is a spring which tends to pull the pawl down upon the ratchet. The sprocket-chains $N^3 N^3$, as best shown in Figs. 12 and 21, have mounted upon alternate links sheet-iron plates $V^3$, at the rear edge of each of which is an upwardly-extending flange $W^3$. The backing material, which may be any suitable fabric or fibrous or other material, ordinarily cotton-batting, crash, paper, cloth, or a combination of these, being first cut or otherwise made of the proper size and form to be applied to the backs of the books, is placed one piece at a time upon each one of the plates $V^3$, with one edge resting against the upright flange $W^3$, and the adjustment of the parts and the relation of the book-holding clamp to these plates when elevated for attaching the backing material to the book are such that the flange acts as a guide or adjusting device for the backing material, so that a portion of it will project beyond the back of the book and may be subsequently folded up against the sides of the book for more complete and strong confinement thereof. This is shown in Fig. 21, in which $Y^3$ is the backing material, being pressed against the back of the book. The mechanical operation of this part of the device is as follows: During the revolution of the shaft E the cam $I^3$, acting against the roller $J^3$, depresses the lever $K^3$. The consequent elevation of the sprocket-wheels $M^3$ causes the frame $P^3$ and the other sprocket-wheels $O^3$ to swing and move upwardly with the sprocket-wheels $M^3$, during which movement the pawl $S^3$ causes a rotation of the sprocket-wheels by reason of its hold upon the ratchet-wheel $R^3$. In this way the next succeeding plate $V^3$ on the sprocket-chains is moved into position, and the adjustments, as already stated, are such that the backing material, which at this time is resting upon these plates, is carried upwardly and attached to the back of the book, being pressed thereon by the upwardly-rising plates $V^3$. The next operation of the machine is—

Fifth. The cover-attaching devices, which are as follows, reference being had to Figs. 1, 2, 8, and 17: Upon the power-shaft E is keyed a cam $A^4$, which engages with a roller $B^4$ on the end of a lever $C^4$, which is fulcrumed at $D^4$ upon a suitable support $E^4$, which rests upon the main frame. The front end of the lever $C^4$ is bifurcated at $F^4$, and on each horn is a roller $G^4$, which is pivoted to a nut $H^4$, turning upon little studs $I^4$. The interior of the nut $H^4$ is threaded, and a threaded rod $J^4$ screws through it, and upon the upper end of this rod is a cover-supporting table $K^4$. $L^4 L^4$ are two shafts supported at one end upon a frame or bracket $M^4$ and at their other ends upon a portion of the frame A, as shown. Upon these shafts are arranged vertical cover-gages $N^4 N^4$, which are supported upon a cross-frame $O^4 O^4$, each provided with a threaded sleeve $P^4$, and the outsides of the shafts $L^4 L^4$ are threaded to coincide with the thread in the sleeve, and at the end of the frames $O^4$, which is opposite that upon which the threaded sleeves are, there is another shorter sleeve $Q^4$, which slides upon the other shaft $L^4$, and upon each of these shafts is fastened a hand-wheel $R^4$, whereby the shafts may be conveniently turned and the guides $N^4$ consequently adjusted toward and from each other and also shifted relative to the center of the table $K^4$, so that any desired position of the covers may be secured. Other guides $z^8 z^9$ (see Fig. 2) may be employed for locating the covers, if desired. The threaded spindle $J^4$ projects below the nut $H^4$ through a slideway $S^4$, (see Fig. 8,) made on the bracket $M^4$, and below this slideway it passes through a sleeve $T^4$, to which it is splined, and upon this sleeve is attached a beveled gear $U^4$, which meshes into another gear $V^4$ upon a shaft which extends through a bearing $W^4$, attached to the bracket $M^4$, and upon the same shaft is keyed a little ratchet-gear $Y^4$ and beyond this gear is a little hand-wheel $Z^4$. The gear $Y^4$ engages with a pawl $A^5$, pivoted to a crank $B^5$, which is keyed to a shaft $C^5$, upon which is keyed a crank $D^5$, to which is pivoted a rod $E^5$, which is connected at $F^5$ to the lever $C^4$. The operation of this part of the machine is as follows: The shaft E revolving, the cam $A^4$, acting upon the roller $B^4$, rocks the lever $C^4$. The free end of the lever moving upwardly carries the spindle $J^4$ and the table $K^4$, upon which the covers are piled one on top of the other. The uppermost one is thus pressed firmly against the back of the book, which is held in the clamps R and W above it. The adhesive material having passed through the fibrous material or other backing stuff, or being squeezed through it by the pressure of the cover, attaches the cover to the back of the book. The spindle $J^4$ slides through the slideway $S^4$ and through the sleeve $T^4$, the spline in the sleeve sliding through a slot in the spindle in a manner well known, and as the free end of the lever $C^4$ goes up it also takes up with it the connecting-bar $E^5$, thus rocking the shaft $C^5$, whereby the pawl $A^5$, acting upon the ratchet-gear $Y^4$, turns the beveled gears $V^4$ and $U^4$, thus slightly rotating the spindle $J^4$ and causing it to screw itself upwardly through the threaded sleeve $H^4$, in this way compensating for the thickness of the covers, which are successively removed by their attachment to the books, and in order that covers of differing thicknesses may be used the throw of the pawl $A^5$ is regulated by a slot $G^5$, made in the arm or lever $B^5$, to which the pawl $A^5$ is attached, so that it may be moved in and out relative to its axis $C^5$, so that it will engage with each succeeding tooth or every other tooth, or every third, fourth, or other tooth of the ratchet-gear $Y^4$, as the case may require. The covers being attached to the back of the book, as stated, the machine next moves them to the next devices, which are—

Sixth. The cover drying, breaking, and pressing devices, which are as follows, reference being had to Figs. $1^a$, $2^a$, 9, 10, 11, 22, and 23: $H^5$ and $I^5$ are two large pulleys suitably journaled upon the frame of the machine. $J^5$ is a gear keyed upon the shaft $K^5$. $L^5$ is a sprocket-wheel upon the shaft $K^5$, and $M^5$ is a sprocket-wheel upon the shaft I, and $N^5$ is a sprocket-chain connecting these wheels. $O^5$ is another gear, which meshes into the gear $J^5$. It is supported upon a shaft $P^5$, which is suitably journaled upon the frame of the machine, and upon this same shaft the large pulley $I^5$ is keyed. It will thus be seen that through the chain of gearing and power-transmitting devices just stated the large pulley $I^5$ is driven from the shaft I. $Q^5$ is a steel belt, which passes around the large pulleys $H^5$ and $I^5$, and between them it passes over a long table or plate of metal $R^5$, which constitutes the upper plate or side of a heating-box $S^5$, which is suitably heated by steam or otherwise. $T^5$ and $U^5$ are two cover-breaking jaws, which slide over the upper surface of the steel band $Q^5$ and close to that band and preferably rest upon it. They are caused to approach and recede by the following arrangement of levers: Upon the shaft E is keyed a cam $V^5$, which acts upon a roller $W^5$ on the end of a lever $Z^5$, which is fulcrumed at $A^6$ in bearings on brackets $C^6 C^6$, which are supported on the frame of the machine. $D^6 D^6$ are two arms, which are keyed upon the shaft $A^6$, and $E^6 E^6$ are two connecting-rods pivoted to these arms and connecting with the clamp or cover-breaker $T^5$ at their other ends. The lever $Z^5$ is adjustably clamped to the shaft $A^6$ by a clamp and bolt $F^6$. $G^6$ and $H^6$ are two rods pivoted at one end, respectively, to arms $I^6 I^6$, which are adjustably clamped to the shaft $A^6$ by clamps and bolts $J^6$, and the other ends of these arms $H^6$ are pivoted at $K^6$ to levers $L^6 L^6$, which are fulcrumed at the lower ends, as at $M^6 M^6$, to brackets $N^6 N^6$, which are supported on the frame of the machine, and at the upper ends of the levers $L^6$ there are pivoted short arms $O^6 O^6$, upon the ends of which the cover-breaker $U^5$ is attached. $P^6$ is a guide-bar for supporting and guiding the loose end or flap of the cover on one side, and $Q^6$ is a similar bar on the other side of the book-holding clamps. These bars are supported upon the upper front portion of the arms $E^6 E^6$ and $O^6 O^6$, respectively, and their forward ends—that is to say, the ends toward the left, as shown in Fig. $1^a$—are curved downwardly below the plane of the back of the books, so that the cover in its flat condition, which is attached to the back of the book, will be moved along by the machine in a plane higher than the extreme forward ends of these guides; but by the time the book has come opposite the forward ends of the breakers $T^5$ and $U^5$ these guides have curved upwardly to a plane higher than the back of the book. Consequently the covers are deflected and bent upwardly, as shown in Fig. 22, so that they are above the incoming breakers $U^5$ and $T^5$, which slide in, as hereinafter explained, and clamp or break the cover sharply around the corners of the book-back, as shown in Fig. 23. We will here state that the breakers $T^5$ and $U^5$ are preferably made, as shown clearly in Fig. $2^a$, as is also the heating-box and steel band $Q^5$, of sufficient length to act a number of times upon the same book—that is to say, the breakers in the machine, as illustrated, are long enough to give three successive squeezes to the same book—and the heating-box and steel band are sufficiently long to allow the same book four periods of rest while in contact with them. This or substantially this construction we prefer, because better results are obtained when there are a plurality of these operations performed upon the same book; but we do not limit ourselves to this construction. Various devices may be successfully employed when sufficient to give or perform a single operation only. It will also be apparent to those who are familiar with this art that these devices may, one or all of them, be divided and located at a suitable, although different, part of the machine, provided their operation or function performed is substantially the same. It is not at all essential that they be located exactly as illustrated, nor is it essential that these instrumentalities should be all in one piece, respectively, nor operated by the same power-conveying instrumentalities, and while upon this subject we desire here to state that the foregoing is true of our machine generally, except where its operation requires a special arrangement, the various parts may be located, combined, actuated, and generally disposed and constructed in any suitable manner to perform the functions described.

The mechanical operation of the devices last described is as follows: The shaft E revolves the cam $V^5$, in contact with the roller $W^5$, which rocks the arm $Z^5$, which in turn rocks the shaft $A^6$, whereupon the arms $D^6 D^6$, acting through the connecting-rods $E^6 E^6$, and the arms $I^6 I^6$, acting through the connecting-rods $H^6 H^6$, levers $L^6 L^6$, and connecting-rods $O^6 O^6$, move the cover-breakers $T^5$ and $U^5$, respectively, toward and from the books, squeezing and breaking the covers around their back edges, as already stated; and in order that books of different thicknesses may be properly covered and the breakers caused to coincide with the axial line of each book, irrespective of its thickness, the adjustable attachments or clamps $F^6$ on the lever $Z^5$ and $J^6 J^6$ on the levers $G^6$ and $H^6$ have been provided, because, as will be seen, by loosening these clamps and bringing the breakers by hand up against the first book, of whatever thickness it may be, the parts will automatically adjust themselves to their then position and to a book of the thickness of the one then present, and while the parts are in such new adjustment and the breakers held firmly against the back of the book, the clamping-bolts of the said clamps $J^6 J^6$ and $F^6$ being set up firmly, the machine is put in position to operate upon books of that thickness.

In order that the steel belt $Q^5$ may at all times have the proper tenseness and variations resulting from contraction and expansion, stretching, wear, &c., be compensated for, we provide a tightening device, as follows: $R^6$ is a smooth-faced pulley fulcrumed to the end of an arm $S^6$, which is pivoted at $T^6$ to the frame of the machine. $U^6$ is a slotted plate rigidly fastened in any suitable manner upon the shaft $T^6$, and $V^6$ is a bolt which passes through the slot in the plate $U^6$ and enters any suitable rigid part of the frame of the machine. By these means and in a well-known manner the pulley $R^6$ may be pressed upwardly with greater or less power, as desired, against the steel band $Q^5$, as shown in Fig. 1$^a$, and set or locked in the desired position by screwing up the set-bolt $V^6$, so that its head or a washer under it shall clamp and firmly hold the plate $Q^6$, and consequently the shaft $T^6$ and pulley $R^6$, in the desired position.

It will be observed that the operation of the cover-feeding, the cover-breaking, and the cover-drying devices, the same as those heretofore described, is intermittent or step by step, deriving their respective movements from devices which either have an intermittent movement themselves or else are so constructed as to act intermittently upon the parts.

In the manner above stated the books are received one at a time in each pair of clamps as they are presented to the operator in an open condition, and in due course each set of clamps has its own book, which is automatically carried step by step through the machine. At each step one or the other of the operations above described are performed upon the books and in due time they are carried up over the right-hand wheels N N of the book-carrying chain and are then carried across the machine in an inverted position and in reverse direction to the delivery end, which is close by the place of feeding, and during this transit the books become sufficiently, if not entirely, dry and hardened, so that they will permanently maintain their shape when delivered from the machine and may be immediately packed for shipment. It therefore only remains to describe—

Seventh. The delivery devices, which are as follows, reference being had to Figs. 1, 2, and 4: The clamp-opening devices for the delivery of the covered book are substantially, if not identically, the same as the devices which open the clamp for the receipt of the books in the first instance—that is to say, having special reference to Figs. 2 and 4. $F^7$ is a cam, the same as the cam F' on the shaft E. $G^7$ is a roller, the same as the roller G'. $H^7$ is a slotted plate or frame, the same as the plate or frame H'. $I^7$ is a set-screw, the same as the set-screw I'. $J^7$ is a sliding connecting-rod, the same as the rod J'. $K^7$ is a slideway or bearing, the same as K'. $L^7$ is a dog, the same as the dog L'. $M^7$ is a laterally-projecting surface from the dog adapted to engage with the lug C on the movable clamp W. These devices just described are spaced so that they shall open the pair of clamps immediately succeeding those which are open for the receipt of a book in the first instance, and when they are opened the book carried by them drops from the clamp through an opening in a plate $A^7$, on the under side of which there are attached two guides for closing the covers up against the sides of the book. They are marked $B^7 B^7$. After dropping through them the book falls on its back upon the delivery-table $C^7$, and then a pusher $D^7$ successively pushes the books along over the table, as shown in Fig. 4, thus always leaving a vacant space for the succeeding book. This pusher is constructed and operated as follows: Upon the main shaft E is arranged a cam $E^7$, which engages with a roller $N^7$ on a pivoted lever $O^7$, pivoted to the frame at $P^7$. It is connected by a connecting-bar $Q^7$ with the pusher-rod $R^7$, which is suitably supported in bearings upon the frame of the machine. The operation is obvious. The cam $E^7$, during the revolution of the shaft E, throws the roller $N^7$ and lever $O^7$ forwardly, and this movement is transmitted to the pusher-rod $R^7$ by the connecting-rod $Q^7$. The parts are retracted by a compressing-spring S⁷, placed between the lever O⁷ and the frame.

The machine as above described is adapted to the manufacture of flat-back books, and before describing the parts employed when we make round-back books, we will describe its operation briefly, as already set forth, that it may be more easily and clearly understood, and in this general description, which we are about to give, we will not recite in detail the operation of the several parts, because that l as already been given during the description of the several devices.

The books are placed, in the first instance, between the clamps of the machine when they are open by the devices first described, located immediately at the left of the saws, as seen in Fig. 2. The book is automatically clamped by the machine and carried during the next forward step thereof against the first gang of saws, where the back is surfaced and the edge of each sheet exposed to the action of the adhesive material. And at the same time another book is put into the succeeding pair of clamps, which are then automatically presented and opened to the operator or feeder. At the next step of the machine the first book is acted upon by the second gang of saws, the second book by the first gang of saws, and still another book is placed within the third pair of clamps in this manner and in step-by-step fashion. The books are received by the machine and are subjected to the various operations in turn—i. e., first, the backs are surfaced, then the backs are brushed, then the adhesive material is applied, then the backing stuff is applied, then the covers are attached, then the covers are deflected so that the cover-breakers act upon their outsides, then they are subjected to the operation of the cover-breakers and to the drying and pressing devices, being squeezed or compressed preferably a plurality of times, then they travel the entire length of the machine and in reverse direction, during which they become dry and firmly set, and finally they are one by one delivered automatically from the machine and piled up in a row in proper shape for packing, unless the edges have to be trimmed. If so, they are in convenient shape to take to the cutting-machine, and it will be observed that in our machine there is no loss or delay occasioned by back movements. The work is progressive and is accomplished at each forward movement of the machine. This is a great advantage; also, that the books when once placed in the machine are automatically treated by it, requiring no attention whatever, excepting to see that a sufficient number of covers are on the cover-feeding table, and a thousand or so of them can be placed there at one time. Therefore, substantially, the only attendance the machine requires is that of a boy or girl to place the books within the clamps in the first instance and of another boy or girl to feed the backing material to the carrier therefor. Of course the machinist or other competent person always present in binderies of sufficient importance to utilize one of these machines will adjust the machine in the first instance to adapt it to run an addition of any special work.

When desiring to make round-backed books, we simply modify the construction and in certain respects the operation of some of the parts as follows, and all of the devices in the machine, excepting those which we shall now specially mention, remain and operate and may be constructed substantially the same as already described for making flat-backed books. Instead of the first gang of saws for dressing the backs, we prefer to employ a knife, which will smoothly and without fibering the back of the books cut off the signature-folds and the rear edges of all the sheets, leaving them smooth and not interlocked with each other in any way, so that they may more certainly and with greater accuracy assume the rounding position which we will hereinafter describe. The knife is shown in Figs. 26, 27, and 28. $a$ is a bracket, which is bolted to the frame of the machine in the place occupied by the first gang of saws. $b\ b$ are stay-rods bolted to the forward end of the bracket $a$, the other ends of the rods being journaled on the main shaft E. $d\ d$ are two connecting-rods operated by cams on the main shaft E. They are connected at $e$ with a sliding knife-carrier $f$, which slides upon ways made on the bracket $a$. $g$ is the knife, which is bolted to the knife-carrier by bolts $h\ h$. $i$ is a clamp sliding under guides $j$, which are bolted to the bracket, as shown. $k$ is a spring coiled about a spindle $l$, which abuts at one end against a lug $m$ on the clamp and the other end against another lug $n$ on the knife-carrier $f$. The spindle $l$ slides through the lug $n$ when the spring is compressed, and it is confined against too great forward movement under the operation of the spring by a washer $o$, the forward end of the spindle $l$ being threaded into the lug $m$. The operation is obvious. As the shaft E is revolved, the cams, acting through the connecting-rods $d\ d$, press the knife forwardly, the stay-rods $b\ b$ acting as a resistance to the cams and strengthening the machine for this operation. The book is held in the clamps already described in proper adjustment, so that as the knife is pressed forwardly it shears off the entire rear surface of the book, the resistance for the knife being afforded by the wooden bar $p$, which is suitably supported upon the bracket. Immediately following the knife and before coming to the second set of saws the book is subjected to the back-rounding devices. (Shown in Figs. 29 and 30.) These are as follows: By the end of the knife we provide a supporting-bar $q$, which is suitably sustained upon any rigid part of the machine, and upon it we place and hold in any suitable manner a female die or former $r$. It is readily removable and may be made of hard wood, if preferred, because it will be necessary to have a number of them adapted to books of different thicknesses, and if made of wood they may be at the time of use easily reduced in size without expense, and the books at the step made by the machine following the one at which the backs were sheared move successively over this female die, and when in this position devices which are or may be identical with those already described for automatically opening the clamp act upon the clamps which hold the book over the female die and open them; but they do not open them so much as in the other cases. The cam which operates the clamp-opener is so constructed and the parts are supplied with such adjusting devices that the clamps open sufficiently only to loosen their hold upon the books, and thereupon a cam suitably located on the shaft E acts upon the rear end of a pivoted lever, the forward bifurcated ends only of which are shown at $s\ s$. It is not deemed necessary to show this entire bar, because this construction is exceedingly simple and cannot fail to be understood. The pivot upon which it rocks may be fastened to any suitable part of the machine, and there is a roller, or, at least, a rounded piece of wood or metal or equivalent material held between the bifurcated ends $s\ s$ in line longitudinally with the axis of the book, and as the shaft E revolves this rounding-depressor $t$ is pressed downwardly against the upper edges of the book, pressing the rear edges of the sheets into the female die $r$ and making the back of the book conform in shape thereto. In Fig. 29 we show the book as having dropped by its own weight through the relaxed clamps. All of the leaves of the book go down together, because there is more friction between paper and paper, especially after having been squeezed together, than there is between paper and the polished surfaces of the clamps. Consequently the exterior sheet on both sides of the book will by their own weight conform to the shape of the female die against which they drop; but the interior sheets, partly because of friction and partly because the inclined surfaces of the die compress them somewhat, are apt not to arrange themselves in conformity with the shape of the female die. Therefore, as shown in Fig. 30, the rocking of the bifurcated lever causes the former $t$ to press downwardly upon the central and, in fact, all of the leaves of the book, thus overcoming such friction as may exist between the leaves and securing the desired result. After the book has been thus rounded at its back the clamps are again allowed to tighten upon the book, and at the next step it moves along to the second gang of saws, which, as before stated, is the only set we ordinarily use for round-backed books, and they are constructed and arranged a little different from those used for flat-backed books and are as shown in Fig. 31—that is to say, they are made of different diameters, the outside saws of the gang having greater diameter than the inner ones, the diameters gradually decreasing from the outside of the gang to its center. This of course gives a concave face to the gang as a whole, and instead of being arranged upon a shaft set at an acute angle to the line of travel of the book-carrying chain of clamps it is set at a right angle thereto, so that the saws revolve in a plane parallel with the line of movement of the clamps. This construction is shown in Fig. 31. $u\ u$ are the outside saws, which have greater diameter than the central ones $v\ v$. $w$ is the shaft, $y$ is the book, and $z\ z$ are the clamps. $a'\ a'$ are guides, substantially the same in their operation as the guides $O'$ and $P'$. (See Figs. 2 and 4.) In both cases they act to stay or support the book during the back-sawing operation; but in the case of round-backed books there is a little difference in shape, the forward edges of the guides against which the book rubs are bent downwardly, as shown in Figs. 31 and 32, so that they will be out of the way of the saws and afford better opportunity for the outer sheets to turn upwardly under the action of the saw, thus giving the offset or widening to the back of the book desirable in round-backed books, and in order that this result may follow these guides $a'\ a'$ are set somewhat higher than those in the other case. The turning outwardly and upwardly of the exterior sheets under the action of the saws is shown at $b'\ b'$, Fig. 31. In Fig. 32 we show the glue-rollers. They are made concave on their edge, the same as the saw. $c'$ is one of the rollers, $d'$ is its shaft, and $e'$ is the concave face, adapted to conform to the back of the book as rounded, and we prefer to elevate the guides $a'\ a'$ a little by bending the edge thereof upwardly just before coming to the glue-rollers, so that they will not be smeared by the glue.

At the next step of the machine the backing material is attached, which, as before stated, may be of various kinds, but preferably cotton-batting, because its fibers intermesh and interlock with the fibrous condition of the back of the book as left by the saws better than most other materials, and at the next step, which in the case of the flat-backed books was that at which the covers were fed and attached, we substitute in the place of those covering devices others, which are as follows, whereby there is automatically made and applied to the rounded backs of the books a strong durable binding material composed, preferably, of crash and paper, thus adapting the books to be bound in the so-called "spring-back" fashion, if desired, and at the same time providing the laterally-projecting flaps, to which the casings can thereafter be fastened in any of the well-known ways. These devices are as follows, reference being had to Figs. 33, 34, 35, 36, and 37: $f'$ (see especially Fig. 33) is the apparatus already described for feeding the cotton-batting, and immediately in front of or beyond it and so located as to properly register with the position of the parts at the next step of the machine is a glue-tank $g'$, in which revolves a roller $h'$, above which is a roll of paper $i'$, supported upon slotted standards $j'$, mounted upon the glue-tank, and a roll of crash or equivalent material $k'$ revolves on an axis supported in bearings on the ends of brackets $l'$, made on the glue-tank. $m'$ is one side of an oscillating frame, pivoted at $n'$ to the standard $j'$. The other side of this frame is not apparent in Fig. 33, but it is supported on the other side of the glue-tank in the same manner as that shown, and the other bracket $l'$ is also not shown for the same reason. $o'$ is a lug, which engages with a set-screw $p'$ to determine the rearward movement of the frame $m'$. $q'$ is a roller revolving on an axis about half-way up the oscillating frame $m'$, and $r'$ is another similar roller at the upper portion of this frame. $s'$ is a little friction-roller or check-roller mounted on the ends of two arms $t'$, which are pivoted to the end of horizontal extensions $u'$ from the frame $m'$. $v'$ $v'$ are wires, a portion of which constitute a spring $w'$. The ends of the wires are attached to the nut of the set-screw $p'$ at one end and at the other end to the little rocking arms $t'$. $y'$ is a little table attached to the upper end of the oscillating frame $m'$, and $z'$ is another table attached to an upright frame $a^2$, supported upon arms $b^2$, in which turns a roller $c^2$, the upper arc of which projects above the table $z'$, and the arms $b^2$ are keyed upon a shaft $d^2$, which is intermittently rocked by a lever $e^2$, which is actuated by a small cam (not shown) upon the main shaft E. $f^2$ is a rocking bar which is sleeved at $g^2$ upon a stud $h^2$, made on or passing through the side of the glue-tank $g'$, and on the upper free end of the rod or bar $f^2$ is attached the shears, constructed as follows: $i^2$ is one blade of the shears. It is pivoted at $j^2$ to the upper end of the bar $f^2$ and has a rearwardly-extending stem $k^2$, which slides through an eyebolt $l^2$, which is secured to any suitable part of the machine, preferably the track or way $u$. The upper blade of the shears $m^2$ is likewise pivoted upon the pivot $j^2$ and has a downwardly-extending bell-crank lever $n^2$, to which is pivoted a connecting-rod $o^2$, to the other end of which there is attached a grooved cam (not shown; because it is well understood) keyed upon the main shaft E. $p^2$ is another rod pivoted at $q^2$ to the rock-bar $f^2$, at the other end of which there is another grooved cam (also not shown) placed upon the main shaft E. The operation of these parts is as follows, the various devices being so timed in a manner well understood as that the parts shall operate and coact with each other so as to effect the results about to be explained: The paper and the crash are both together passed from their respective rolls about the small rollers $q'$ and $r'$, as shown by reference-letter $r^2$, and thence over the tables $y'$ and $z'$, and it will be noticed that the crash comes upon the pasted side of the paper and that it will be pressed to the paper and caused to adhere thereto by the pressure of the rollers $q'$ and $r'$, and these two materials are cut to substantially the desired width, sufficient, in other words, to cover the rounded back of the books and project laterally therefrom at each side sufficient to form the flap for the attachment of the casings thereto. As the shaft E revolves the lever $e^2$ is intermittently rocked, which rocks the shaft $d^2$, and consequently lifts the roller $c^2$ and the table $z'$ and the compound strip of crash and paper up against the back of the book. The adhesive material oozes or is pressed partially through the crash, and it also passes through the cotton-batting on the back of the book, so that when the table $z'$ and the roller $c^2$ bring the crash and paper against the book-back it adheres thereto, and at the next step of the machine the paper and crash are pulled forwardly with the book, and this pull causes the oscillating frame $m'$ to rock forwardly, somewhat expanding or stretching the spring $w'$, and at the same time unwinding more of the paper and crash; but before the book starts the roller $c^2$ and table $z'$ have again moved downwardly. The forward movement of the book is sufficient to bring the rear of the clamps which hold the book a trifle in advance of the shears, so that the shaft E, continuing to revolve, the connecting-rod $p^2$, being acted upon by its grooved cam, which is upon the shaft E, swings the bar $f^2$ forwardly and the crash and paper passes between the blades of the shears. The bar $f^2$ is held in this position by the construction of the cams, while the cam at the end of the rod $o^2$, which is also on the shaft E, operates the shears and severs the paper and crash. Thereupon the spring $w'$ acts and retracts the oscillating frame $m'$ until it is stopped by the set-screw $p'$, engaging with the lug $o'$, and the friction or check roll $s'$ during this operation holds the compound strip $r^2$ so that it will not drop back or become misplaced, but will be simply drawn back over the table $z'$ and roller $c^2$ into the proper position to register with and be attached to the next succeeding book upon a repetition of the movements. The oscillating frame $m'$ is employed, among other reasons, so that the material composing the compound strip may not be wasted, which would be the case were it not possible to retract that material after having been once severed. Immediately in advance of the devices last described the book is subjected to the operation of devices for pressing and drying and breaking this stiff strong compound backing material upon the book, which are as follows, reference being had especially to Figs. 35, 36, and 37, these devices being substituted for the cover pressing, drying, and breaking devices heretofore described.

The book-carrying chain of clamps is shown passing over the devices about to be described, the links R of which only are indicated in these figures to avoid confusion. The clamp-plates and also the books (three in number) are also shown in proper relative positions. $s^2$ is a wheel substantially the same as the pulley $I^5$, (shown in Fig. 1$^a$,) which supports the steel band $Q^5$—that is to say, this wheel $s^2$ performs substantially the same function, but it is totally different in construction. It is made double, as shown in Fig. 36, and has radially-projecting arms or spokes $t^2$, in the ends of which notches or recesses $s^3$ are formed, adapted to engage with the cross-bolts $u^2$, which connect what may be called "links" of the presser, breaker, and drier chain. This chain comprises a series of centrally-located bars or plates $v^2$, which are fulcrumed at their ends on cross-bolts $u^2$, on the ends of which are little rollers $y^2\ y^2$, &c. These little rollers roll along upon tracks $z^2\ z^2$, (see especially Fig. 36,) which are capable of vertical adjustment by being supported upon brackets $a^3 a^3$ through the instrumentality of vertically-adjustable set-screws $b^3$, which are threaded into bosses or enlargements $c^3\ c^3$, made on the bracket $a^3$, the upper ends of which enter and turn in sockets made in the under surface of similar bosses $d^3$, formed upon the sides of the rails $z^2$. On the under side of the bars or frames $v^2$ and near each end of each one there are two downwardly extending and diverging arms $e^3\ e^3$ and $f^3\ f^3$, between the extremities of which bolts or pivots $g^3\ g^3$ extend, upon which are fulcrumed crescent-shaped clamping-levers $h^3\ h^3$, from the outer surface of each of which there extends a stem $i^3\ i^3$, upon which turn little rollers $j^3\ j^3$, which likewise roll upon the tracks $z^2\ z^2$. The operation is as follows: The double wheel $s^2\ s^2$ and also its companion, over which the clamping, pressing, and drying chain passes in the same manner as the book-carrying chain passes over its wheel, which are similarly constructed, are supported upon suitable bearings and are suitably driven by the same devices as those which drive the steel bands in the other construction, and of course the movement is intermittent, and as each book comes to these devices in its transit through the machine its back upon which the compound piece of paper and crash has been already partially adhered is received upon or pressed against the concave upper surface of the bar $v^2$. Up to this time, assuming that we are considering the machine as having no books in it, the one referred to being the first book which comes to these devices, the weight of the drying, pressing, and breaking frame has been carried by the rollers $y^2\ y^2$ &c., which roll along upon the rails $z^2\ z^2$ between the double wheels $s^2$ and the crescent-shaped clamps when there is no book between them, simply close quite closely together when the little rollers $j^3$ come in contact with the rails $z^2$; but as soon as a book comes along and rests in the concave upper surface of the bar or frame $v^2$ of any link then the crescent-shaped clamps $h^3$ in attempting to close when their rollers $j^3$ come in contact with the inclined forward end of the rails $z^2$ they come in contact with the book, or, rather, with the outer surface of the compound backing material of paper and crash, (marked $k^3$ in Fig. 36,) and consequently the little rollers $j^3$ cannot rise to the plane of the under side of the rollers $y^2$, and consequently the entire chain is elevated somewhat and rides upon the rollers $j^3$ only. This, as will be seen, exerts a very peculiar clamping and pressing action upon the books, because not only are the inner edges of the clamping surfaces of the crescent-shaped clamps pressed hard against the crash and paper just above the back edge of the book, but also, owing to the leverage action, the plate $v^2$ is drawn snugly up against the back of the book, firmly pressing the compound material upon it. If desired, which, however, will not ordinarily be necessary, the plates $v^2$ and also the crescent-shaped clamps $h^3$, and in fact this whole part of the apparatus, may be kept warm or hot by gas-jets $l^3\ l^3$, &c., supplied from a suitably-located pipe $m^3$ in a manner well understood.

It is obvious that the books may be subjected to the clamping and pressing operation of these devices as long as desired by simply extending the track and the chain, and it is also obvious that within certain limits adjustment of the crescent-shaped clamps and coacting parts may be obtained by elevating or depressing the rails $z^2$ by means of the set-screws $b^3$. The crescent-shaped clamps let go of the book by running down an incline at the farther end of the rails or by passing off the end of the rails, whereupon the chain slightly lowers, the wheels $y^2$ come in contact with the rails and support it, and the rollers $j^3$, being at this time unsupported, (they, as stated, having passed beyond the rails,) will, under the influence of gravity, fall open by themselves, thus releasing the books, which will thereafter be carried by the main carrier-chain up over the wheel and back again to the delivery end of the machine.

It will be obvious to those who are familiar with this art that a great many modifications may be made in the construction of the various parts of our machine. We therefore do not limit ourselves to the details, but intend to cover in the claims hereof all mechanical equivalents for the construction shown by us. Many such equivalents are known to us, which, however, we make no mention of, because if all were mentioned this specification would become too ponderous to be easily comprehended.

We claim—

1. The herein-described method of mechanically binding and covering books and the like, which consists in evening the back of the book, applying adhesive material thereto, applying backing material thereto, presenting the cover in its flat condition thereto, and pressing the cover upon the book, substantially as set forth.

2. The herein-described method of mechanically binding and covering books and the like, which consists in surfacing the back of the book, applying adhesive material thereto, presenting the cover in its flat condition thereto, and pressing the cover upon the book, substantially as set forth.

3. The herein-described method of mechanically binding and covering books and the like, which consists in surfacing the back of the book, applying adhesive material thereto, applying a backing material thereto, presenting a cover in its flat condition thereto, pressing the cover upon the book, and folding the flaps of the cover against the sides of the book, substantially as set forth.

4. The herein-described method of mechanically binding and covering books and the like, which consists in surfacing the back of the book, removing loose particles therefrom, applying adhesive material thereto, presenting the cover thereto, and pressing the cover upon the book-back, substantially as set forth.

5. The herein-described method of mechanically binding and covering books and the like, which consists in surfacing the back of the book, removing the loose particles therefrom, applying adhesive material thereto, applying fibrous or other backing material upon the back of the book, applying the cover thereto, and by pressure squeezing the adhesive material through the backing material to the cover, substantially as set forth.

6. The herein-described method of mechanically binding and covering books and the like, which consists in surfacing the back of the book, removing the loose particles therefrom, applying adhesive material thereto, applying fibrous or other backing material upon the back of the book, applying the cover thereto, and by pressure squeezing the adhesive material through the backing material to the cover, smoothing the cover upon the back of the book, and folding its flaps against the sides of the book, substantially as set forth.

7. The herein-described method of mechanically binding and covering books and the like, which consists in surfacing the back of the book, removing loose particles therefrom, applying adhesive material thereto, applying backing material thereto, applying a cover thereto, rubbing down and pressing the cover against the book-back, and breaking its flaps around the corners of the book, substantially as set forth.

8. The herein-described method of binding books, which consists in surfacing the back of the book, applying adhesive material thereto, applying backing material thereto, and pressing the same against the book-back, substantially as set forth.

9. The herein-described method of binding books, consisting in surfacing the back of the book, removing loose particles therefrom, applying adhesive material thereto, and applying and pressing backing material upon the back of the book, substantially as set forth.

10. The herein-described method of mechanically and successively binding books, consisting in successively clamping the books, then moving them to a back-surfacing device, then to a gluing device, then to devices for applying the backing material, and then to cover-applying devices, substantially as set forth.

11. The herein-described method of mechanically and successively binding and covering books, consisting in successively clamping the books, then subjecting them to back-surfacing devices, then to devices for removing loose particles, then to devices for applying adhesive material, then to devices for applying the backing material, and then to devices for applying and pressing the cover upon the book, whereby they are successively bound and covered.

12. The herein-described method of binding books mechanically and automatically, consisting in first clamping the books, then surfacing their backs, then unclamping them and rounding their backs, then applying adhesive material to the backs, and then applying backing material to the backs and pressing the same upon the books, substantially as set forth.

13. The herein-described method of mechanically and automatically binding books, consisting in first clamping the books, then surfacing their backs, then unclamping and rounding the backs, then roughening or fibering the backs as rounded, then applying adhesive material to the backs, and then applying and pressing backing material to the backs, substantially as set forth.

14. The herein-described process of mechanically and automatically binding books, consisting in first clamping the books, then surfacing their backs, then unclamping them and rounding their backs, then applying adhesive material to their backs as rounded, then simultaneously making and applying a compound backing material to the books, and then pressing and drying the backing material upon the books, substantially as set forth.

15. The herein-described process of mechanically and automatically binding books, consisting in first clamping the books, then surfacing their backs, then unclamping and rounding their backs, then applying adhesive material to the backs, then simultaneously making and applying to the backs a compound backing material, and then forming or shaping and pressing the backing material upon the back and about the edges of the book, substantially as set forth.

16. The herein-described process of mechanically and automatically binding books, consisting in first clamping the books, then surfacing their backs, then unclamping and rounding their backs, then applying adhesive material to the back of the book, then automatically feeding and applying fibrous material to the back, then simultaneously making and applying to the book a compound binding material and pressing the same upon the book, whereby the adhesive material is squeezed through the fibrous material, and then forming and shaping the compound backing material upon the back and about the edges of the book, substantially as set forth.

17. The herein-described process of preparing books for binding, consisting of clamping the books, and then surfacing their backs by cutting or paper-removing devices operating at different angles relative to the back of the book, substantially as set forth.

18. The process described of preparing books for binding, consisting in clamping or holding the books in their desired position, slicing or removing the back edges of the book-leaves, roughening the said edges, and applying adhesive material thereto, substantially as set forth.

19. The described process of preparing books for binding, consisting in holding or clamping the books in the desired position, surfacing the back of the books, and applying adhesive material thereto by a plurality of devices for applying the same, which operate upon the same book successively, substantially as set forth.

20. The method described of applying adhesive material to the backs of books, consisting in simultaneously applying the adhesive material and puncturing the back of the book, whereby the material is injected or worked into the back of the book, substantially as set forth.

21. The method herein described of preparing books for binding, consisting in evening the backs of the books, fibering or roughening the same, and working adhesive material into the same, substantially as set forth.

22. The method herein described of binding books, consisting in applying adhesive material to the back of the book, applying fibrous material upon the same, and simultaneously constructing, applying, and pressing to the back of the book a compound binding material, whereby the glue is squeezed through the fibrous material, substantially as set forth.

23. The method herein described of binding books mechanically, consisting in applying adhesive material to the back of the book, applying the binding material to the book, then moving the book and material to a severing device, severing the binding material, and returning it to position ready for the next succeeding book, substantially as set forth.

24. The combination of a book-carrier adapted to grasp and hold the book, a back-surfacing device, and back-gluing devices, substantially as set forth.

25. The combination of a book-carrier adapted to grasp and hold a book, and a plurality of devices for surfacing the back of the book, acting upon it at different angles, substantially as set forth.

26. The combination of a book-carrier adapted to grasp and hold a book, a plurality of devices for surfacing the back of the book, acting upon it at different angles, and a back-brushing device, substantially as set forth.

27. The combination of a book-carrier adapted to grasp and hold a book, back-surfacing devices, and a plurality of back-gluing devices constructed and arranged to act upon the same book, substantially as set forth.

28. The combination of a book-carrier adapted to grasp and hold a book, a plurality of devices for surfacing the back of the book, and a plurality of glue-applying devices adapted to act upon the same book, substantially as set forth.

29. The combination of a book-carrier adapted to grasp and hold a book, surfacing devices for the back of the book, back-brushing devices, and a plurality of glue-applying devices adapted to act upon the same book, substantially as set forth.

30. The combination of a book-carrier adapted to grasp and hold a book, a back-surfacing device, back-gluing devices, and feeding devices for the backing material, substantially as set forth.

31. The combination of a book-carrier adapted to grasp and hold a book, a back-surfacing device, back-gluing devices, and applying and feeding devices for the backing material, substantially as set forth.

32. The combination of a book-carrier adapted to grasp and hold a book, a back-surfacing device, back-gluing devices, a device for feeding backing material to the books, and devices for pressing and shaping the same upon the book, substantially as set forth.

33. The combination of a book-carrier adapted to grasp and hold a book, a back-surfacing device which evens and roughens the back of the book, and glue-applying devices which simultaneously apply the adhesive material and puncture the back of the book, substantially as set forth.

34. The combination of a book-carrier adapted to grasp and hold a book, a back-surfacing device, and a device for applying adhesive material, which likewise punctures the back of the book, substantially as as set forth.

35. The combination of a book-carrier adapted to grasp and hold a book, a back-surfacing device, a back-brushing device, and a glue-applying device, substantially as set forth.

36. The combination of a book-carrier adapted to grasp and hold a book, a back-surfacing device, a back-brushing device, and a glue-applying device, which likewise punctures the back of the book, substantially as set forth.

37. The combination of a movable book-clamping device adapted to grasp and hold the book, a gluing device, and a feeding device for the backing material, substantially as set forth.

38. The combination of a movable book-clamping device, a gluing device, and a feeding and attaching device for presenting and pressing backing material to and upon the book, substantially as set forth.

39. The combination of a book-carrier, a gluing device, and feeding and attaching device for presenting and pressing backing material to and upon the book, and a cover-feeding device, substantially as set forth.

40. The combination of a book-carrier, a gluing device, a feeding and attaching device for presenting and pressing backing material to and upon the book, a cover-feeding device, and cover breaking and pressing devices, substantially as set forth.

41. The combination of a book-carrier, back-surfacing devices, a gluing device, a feeding and attaching device for presenting and pressing backing material to and upon the book, a cover-feeding device, and cover breaking and pressing devices, substantially as set forth.

42. The combination of a book-carrier, a back-surfacing device, a brush, a gluing device, a feeding and attaching device for the backing material, a cover-feeding device, and a cover breaking and pressing device, substantially as set forth.

43. The combination of a book-carrier, a back-surfacing device, a gluing device, a feeding and attaching device for the backing material, a back-rounding device, a roll of paper and a roll of crash or like material and a gluing apparatus coacting therewith, means to bring the paper and crash together, and means for applying the same to the back of the book, and a severing device, substantially as set forth.

44. The combination of a book-carrier, a back-surfacing device, a gluing device, a feeding and attaching device for the backing material, a back-rounding device, a roll of paper and a roll of crash or like material and a gluing apparatus coacting therewith, means to bring the paper and crash together, and means for applying the same to the back of the book, and a severing device, and means automatically operated whereby the paper and crash are formed or shaped upon the back and around the edges of the book, substantially as set forth.

45. In a book binding and covering machine, the combination of a feeding and attaching device for the backing material, and a cover feeding and attaching device, substantially as set forth.

46. In a book binding and covering machine, the combination of feeding and attaching devices for the backing material, a cover-feeding device, and a cover breaking and pressing device, substantially as set forth.

47. In a bookbinding-machine, the combination of gluing devices for the back of the book, devices for feeding and attaching fibrous or like materials thereto, a roll of paper and a roll of crash or like materials, a gluing device coacting with said rolls, means to bring the paper and crash together, and means for applying the compound strip to the book-back, substantially as set forth.

48. In a bookbinding-machine, the combination of gluing devices for the back of the book, devices for feeding and attaching fibrous or like materials thereto, a roll of paper and a roll of crash or like materials, a gluing device coacting with said rolls, means to bring the paper and crash together, and means for applying the compound strip to the book-back, and a severing device for the compound strip, substantially as set forth.

49. In a bookbinding-machine, the combination of a roll of paper and a roll of crash or like materials, a gluing device coacting therewith, means to bring the crash and paper together, and means to bring them in contact with the book, and a device for severing the crash and paper, substantially as set forth.

50. In a bookbinding-machine, the combination of a roll of paper and a roll of crash or like materials, a gluing device coacting therewith, means to bring the crash and paper together, means to bring the compound strip thus formed into contact with the book-back, a severing device for the compound strip, and means to form or shape the compound strip upon the back and edges of the book, substantially as set forth.

51. In a bookbinding-machine, the combination of a plate or bar, a clamp upon each side thereof, and means whereby the plate or bar is pressed against the back of the book and simultaneously therewith the clamps are pressed against the sides of the book near the back edges, whereby the backing material is formed upon or about the back of the book and its edges, substantially as set forth.

52. In a book binding or covering machine, the combination of clamps which hold the book and carry it forwardly, back-surfacing devices and back-gluing devices, and means between the two last devices whereby the clamp is relaxed and the back of the book rounded and the clamp again caused to grip the book in its changed condition, substantially as set forth.

53. In a book binding or covering machine, the combination of clamps which hold the book and carry it forwardly, back-surfacing devices and back-gluing devices, and means between the two last devices whereby the clamp is relaxed and the back of the book rounded and the clamp again caused to grip the book in its changed condition, and devices for feeding and attaching backing material to the book, substantially as set forth.

54. In a book binding or covering machine, the combination of clamps which hold the book and carry it forwardly, back-surfacing devices and back-gluing devices, and means between the two last devices whereby the clamp is relaxed and the back of the book rounded and the clamp again caused to grip the book in its changed condition, and devices for feeding and attaching backing material to the book, and means for applying adhesive material between the paper and crash or like materials and for uniting them to each other and to the book, substantially as set forth.

55. In a book binding or covering machine, the combination of clamps which hold the book and carry it forwardly, back-surfacing devices and back-gluing devices, and means between the last two devices whereby the clamp is relaxed and the back of the book rounded and the clamp again caused to grip the book in its changed condition, and devices for feeding and attaching backing material to the book, and means for applying adhesive material between the paper and crash or like materials and for uniting them to each other and to the book, and means to clamp or press the compound strip of paper and crash or like materials upon the back and about the edges of the book, substantially as set forth.

56. In a bookbinding-machine, the combination of jaws or clamps which hold the book and carry the same, a die or former for the book-back, and devices constructed and arranged to relax the clamps and to press the book into the said mold or former when the clamps are coincident in location with them, substantially as set forth.

57. In a book binding or covering machine, the combination of movable book holding and carrying clamps, and devices constructed and arranged to open the clamps when they are at rest, substantially as set forth.

58. The combination, in a book binding or covering device, of movable clamps adapted to hold and carry the book, and means for opening the clamps when they are at rest, actuated by the main shaft of the machine, substantially as set forth.

59. An intermittently-moving book-carrier having a plurality of book-holding clamps, surfacing devices and gluing devices for the backs of the books, and devices for feeding the backing material and the covers to the books, all of which are fixed in location, whereby the books are moved by the carrier coincident with the said devices successively, substantially as set forth.

60. The combination, in a book binding or covering machine, of an intermittently-moving book-carrier having a plurality of book-holding clamps, continuously-running book-surfacing and book-gluing devices for the backs of the books against which the said carrier successively carries the books, and means for feeding and attaching backing material and covers to the backs of the books, substantially as set forth.

61. The combination, in a book binding or covering machine, of a carrier provided with book-holding clamps adapted to hold and carry a book and to sustain it while being operated upon, and means for opening or relaxing said clamps, changing the position or arrangement of the book, and reclamping it in its altered condition for further operations, substantially as set forth.

62. In a book covering or binding machine, the combination of two endless carriers placed relatively to each other so that the adjacent portions run in the same direction, one of them having book-holding clamps and the other having devices which operate upon the book, substantially as set forth.

63. In a book covering or binding machine, the combination of two endless carriers placed relatively to each other in such manner that the adjacent portions run in the same direction, one of them having book-holding clamps and the other having devices which operate upon the book, both of them having an intermittent or step-by-step movement, substantially as set forth.

64. In a book binding or covering machine, the combination of a feeding device for feeding and applying backing material to the glued book, comprising a sprocket chain or belt which supports plates or tables having flanges upon one edge, and means whereby said devices are intermittently lifted against the back of the book, substantially as set forth.

65. In a book binding or covering machine, the combination of a feeding device for feeding and applying backing material to the glued book, comprising a sprocket chain or a belt arranged on an inclined plane, plates or tables supported and carried by the sprocket chain or belt, a flange on the lower edge of each of said plates or tables, and means whereby the said devices are intermittently elevated against the back of the book, substantially as set forth.

66. In a bookbinding-machine, the combination of clamps which hold the book and carry the same, back surfacing or evening devices, and guides or supports which sustain the book against the action of the surfacing devices below the clamps, substantially as set forth.

67. In a bookbinding-machine, the combination of clamps which hold the book and carry the same, back surfacing or evening devices, and guides or supports, one of them fixed and the other yielding to admit the book between them, whereby the book is sustained against the action of the surfacing devices, substantially as set forth.

68. In a bookbinding-machine, the combination of a roll of paper and a roll of crash or like materials, an oscillating frame carrying a roller over which the paper and crash are both led, and means whereby the combined material may be attached to the books, so that the said frame will be pulled in one direction by the movement of the books and in the reverse direction by a spring or its equivalent, substantially as set forth.

Signed at New York, in the county of New York and State of New York, this 10th day of September, A. D. 1891.

CHARLES W. LOVELL.
ALFRED BREDENBERG.

Witnesses:
PHILLIPS ABBOTT,
CHARLES RYDER.